United States Patent
Maiya et al.

(10) Patent No.: US 9,930,722 B2
(45) Date of Patent: Mar. 27, 2018

(54) DISCONTINUOUS RECEPTION TECHNIQUES

(71) Applicant: QUALCOMM Incorporated, San Diego, CA (US)

(72) Inventors: Shashank Vishwanatha Maiya, Sunnyvale, CA (US); Jimmy Chi-Wai Chui, San Francisco, CA (US); Wei Zhang, Santa Clara, CA (US); Sharif Ahsanul Matin, San Diego, CA (US); Nate Chizgi, Sunnyvale, CA (US)

(73) Assignee: QUALCOMM Incorporated, San Diego, CA (US)

(*) Notice: Subject to any disclaimer, the term of this patent is extended or adjusted under 35 U.S.C. 154(b) by 69 days.

(21) Appl. No.: 14/624,278

(22) Filed: Feb. 17, 2015

(65) Prior Publication Data
US 2016/0007404 A1  Jan. 7, 2016

Related U.S. Application Data

(60) Provisional application No. 62/021,558, filed on Jul. 7, 2014.

(51) Int. Cl.
*H04W 76/04* (2009.01)
*H04W 56/00* (2009.01)

(52) U.S. Cl.
CPC ......... *H04W 76/048* (2013.01); *H04W 56/00* (2013.01)

(58) Field of Classification Search
CPC .................. H04W 76/048; H04W 56/00
See application file for complete search history.

(56) References Cited

U.S. PATENT DOCUMENTS

2009/0196256 A1  8/2009 Digirolamo et al.
2009/0238098 A1  9/2009 Cai et al.
(Continued)

FOREIGN PATENT DOCUMENTS

AU  2013206245 A1  7/2013
WO  WO-2010078365 A1  7/2010

OTHER PUBLICATIONS

Broadcom Corporation: "Small Cell on/Off procedures for Single Carrier case", May 18, 2014 (May 18, 2014), 3GPP DRAFT; R2-142125-Small Cell on Off Procedures for Single Carrier Case, 3RD Generation Partnership Project (3GPP), Mobile Competence Centre; 650, Route Des Lucioles; F-06921 Sophia-Antipolis Cedex; France, 4 Pages, XP050793353, Retrieved from the Internet: URL: http://www.3gpp.org/ftp/Meetings_3GPP_SYNC/RAN2/Docs/ [retrieved on May 18, 2014] the whole document.
(Continued)

*Primary Examiner* — Gbemileke J Onamuti
(74) *Attorney, Agent, or Firm* — Loza & Loza, LLP

(57) ABSTRACT

Various aspects of the present disclosure provide for conditionally disabling discontinuous reception (DRX). For example, DRX may be disabled if there is a loss of DRX synchronization, a loss of signal radio bearer traffic, a poor radio frequency condition, a low signal-to-interference ratio estimate, a low transmit power condition, or a drop in transmit power. Various aspects of the present disclosure provide for determining that an access terminal and the network are not in synchronization (e.g., DRX synchronization), and attempting to re-synchronize the access terminal and the network. In cases where a loss of DRX synchronization involves one entity having DRX enabled while another entity has DRX disabled, DRX may be temporarily disabled until synchronization is restored. In cases where a loss of DRX synchronization involves different entities using different subframe indices, the subframe index used by
(Continued)

one of the entities may be changed to restore synchronization.

16 Claims, 18 Drawing Sheets

(56) References Cited

U.S. PATENT DOCUMENTS

| | | | | |
|---|---|---|---|---|
| 2009/0239566 A1* | 9/2009 | Pelletier | ............. | H04W 56/005 |
| | | | | 455/517 |
| 2011/0294491 A1* | 12/2011 | Fong | ...................... | H04L 5/001 |
| | | | | 455/422.1 |
| 2014/0098694 A1* | 4/2014 | Damji | ............... | H04W 52/0229 |
| | | | | 370/252 |
| 2016/0081076 A1* | 3/2016 | Zhang | ................... | H04B 7/026 |
| | | | | 370/336 |

OTHER PUBLICATIONS

International Search Report and Written Opinion—PCT/US2015/038378—ISA/EPO—Sep. 30, 2015.

* cited by examiner

DISCONTINUOUS RECEPTION TECHNIQUES

CROSS-REFERENCE TO RELATED APPLICATION(S)

This application claims priority to and the benefit of provisional patent application No. 62/021,558 filed in the U.S. patent office on Jul. 7, 2014, the entire content of which is incorporated herein by reference.

BACKGROUND

Field of the Disclosure

Aspects of the disclosure relate generally to wireless communication, and more specifically, but not exclusively, to conditionally disabling discontinuous reception and to maintaining discontinuous reception synchronization between wireless communication apparatuses.

Description of Related Art

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). UMTS also supports enhanced 3G data communications protocols, such as High Speed Packet Access (HSPA), which provides higher data transfer speeds and capacity to associated UMTS networks. Long Term Evolution (LTE), LTE-Advanced (LTE-A), CDMA2000, and Evolution-Data Optimized (EV-DO) are other examples wireless communication networks. As the demand for mobile broadband access continues to increase, research and development continue to advance wireless communication technologies not only to meet the growing demand for mobile broadband access, but to advance and enhance the user experience with mobile communications.

Some wireless communication technologies employ discontinuous reception (DRX) to conserve system resources. DRX defines an ON period for reception at an access terminal such as a user equipment (UE) and an OFF period for reception at the access terminal. Consequently, the access terminal can switch to a low power mode during the DRX OFF period to conserve battery power since the network (e.g., a serving base station) will not be transmitting to the access terminal over one or more specified channels during this DRX OFF period.

In practice, the network and a UE might not be in synchronization (sync) with respect to a DRX cycle. For example, the network might have entered DRX but the UE hasn't, or vice versa. The first scenario would generally result in reduced power savings, but might not otherwise affect communication performance. In contrast, the second scenario could potentially result in the UE failing to receive DL data/signaling information transmitted by the network. Consequently, call drops could occur in this scenario.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

In one aspect, the disclosure provides a method for wireless communication including enabling discontinuous reception (DRX); receiving a signal; identifying a DRX out-of-synchronization condition when DRX is enabled, wherein the identification is based, at least in part, on the received signal; and disabling DRX as a result of the identification of the condition.

Another aspect of the disclosure provides an apparatus for wireless communication that includes a processing circuit; and a communication interface coupled to the processing circuit and configured to receive a signal; wherein the processing circuit is configured to: enable discontinuous reception (DRX); identify a DRX out-of-synchronization condition when DRX is enabled, wherein the identification is based, at least in part, on the received signal; and disable DRX as a result of the identification of the condition.

Another aspect of the disclosure provides an apparatus configured for wireless communication. The apparatus including means for enabling discontinuous reception (DRX); means for receiving a signal; means for identifying a DRX out-of-synchronization condition when DRX is enabled, wherein the identification is based, at least in part, on the received signal; and wherein the means for enabling DRX is configured to disable DRX as a result of the identification of the condition.

Another aspect of the disclosure provides a non-transitory computer readable medium storing computer executable code, including code to enable discontinuous reception (DRX); receive a signal; identify a DRX out-of-synchronization condition when DRX is enabled, wherein the identification is based, at least in part, on the received signal; and disable DRX as a result of the identification of the condition.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations it should be understood that such implementations can be implemented in various devices, systems, and methods.

DETAILED DESCRIPTION

The description set forth below in connection with the appended drawings is intended as a description of various configurations and is not intended to represent the only configurations in which the concepts and features described herein may be practiced. The following description includes specific details for the purpose of providing a thorough understanding of various concepts. However, it will be apparent to those skilled in the art that these concepts may be practiced without these specific details. In some instances, well known circuits, structures, techniques and components are shown in block diagram form to avoid obscuring the described concepts and features.

Figure 1:
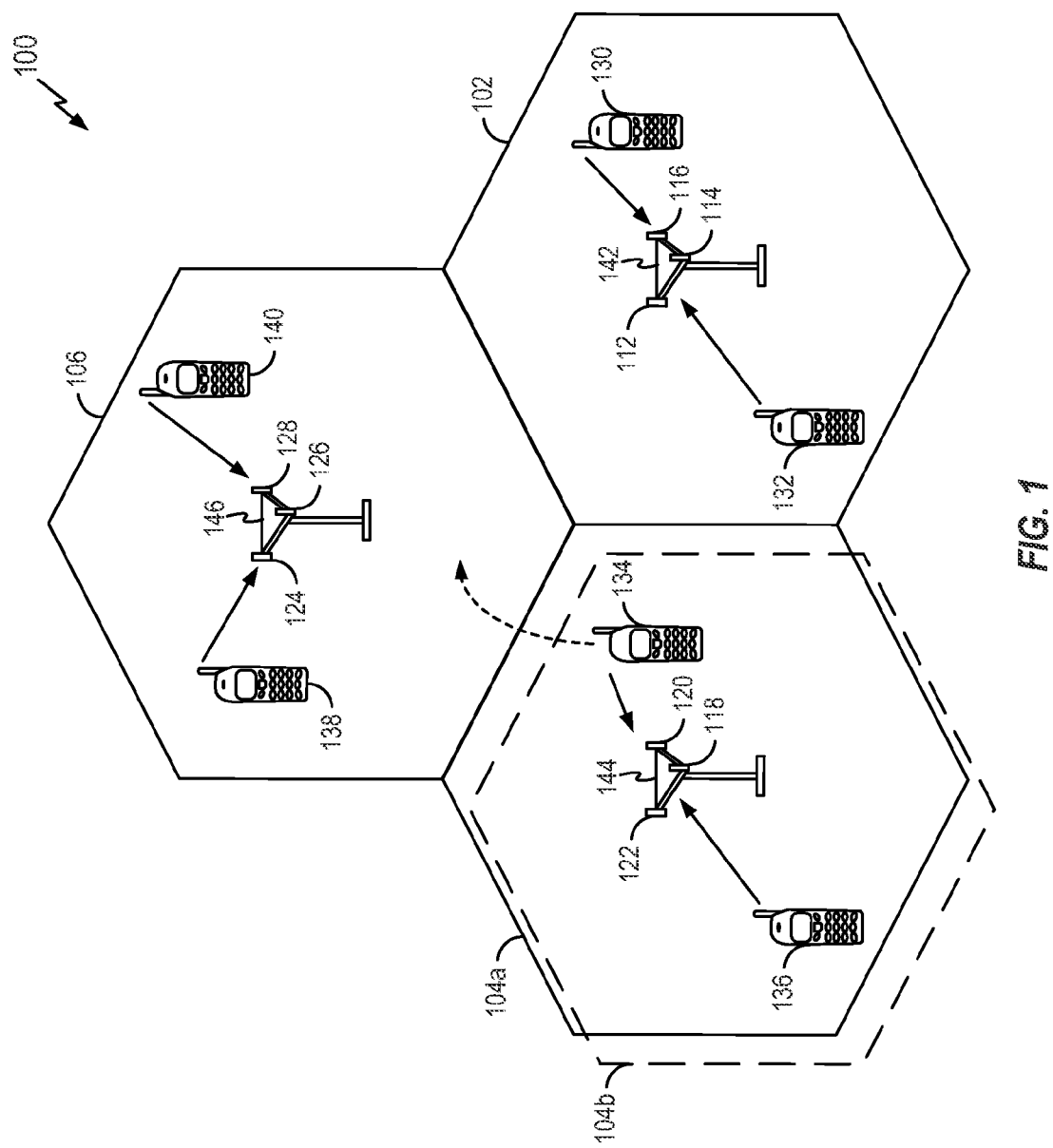
FIG. 1 is a conceptual diagram illustrating an example of a network environment in which one or more aspects of the present disclosure may find application.

The various concepts presented throughout this disclosure may be implemented across a broad variety of telecommunication systems, network architectures, and communication standards. Referring to FIG. 1, by way of example and without limitation, a simplified access network 100 in a UMTS Terrestrial Radio Access Network (UTRAN) architecture, which may utilize High-Speed Packet Access (HSPA), is illustrated. The system includes multiple cellular regions (cells), including cells 102, 104, and 106, each of which may include one or more sectors. Cells may be defined geographically, e.g., by coverage area, and/or may be defined in accordance with a frequency, scrambling code, etc. That is, the illustrated geographically-defined cells 102, 104, and 106 may each be further divided into a plurality of cells, e.g., by utilizing different frequencies or scrambling codes. For example, cell 104a may utilize a first frequency or scrambling code, and cell 104b, while in the same geographic region and served by the same Node B 144, may be distinguished by utilizing a second frequency or scrambling code.

In a cell that is divided into sectors, the multiple sectors within a cell can be formed by groups of antennas with each antenna responsible for communication with UEs in a portion of the cell. For example, in cell 102, antenna groups 112, 114, and 116 may each correspond to a different sector. In cell 104, antenna groups 118, 120, and 122 each correspond to a different sector. In cell 106, antenna groups 124, 126, and 128 each correspond to a different sector.

The cells 102, 104 and 106 may include several UEs that may be in communication with one or more sectors of each cell 102, 104 or 106. For example, UEs 130 and 132 may be in communication with Node B 142, UEs 134 and 136 may be in communication with Node B 144, and UEs 138 and 140 may be in communication with Node B 146. Here, each Node B 142, 144, 146 is configured to provide an access point to a core network 204 (see FIG. 2) for all the UEs 130, 132, 134, 136, 138, 140 in the respective cells 102, 104, and 106.

Figure 2:
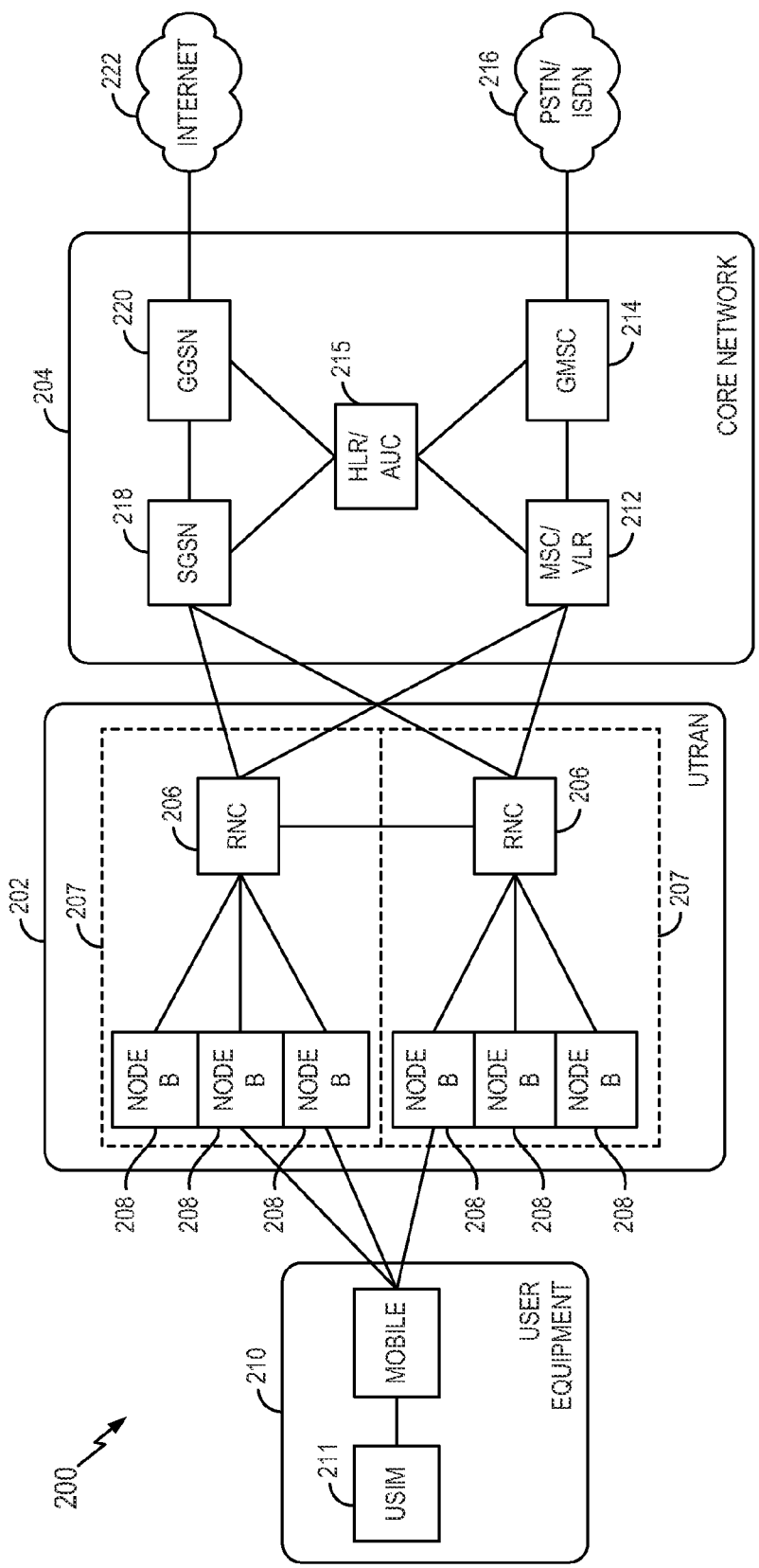
FIG. 2 is a block diagram illustrating an example of a communication system in which one or more aspects of the disclosure may find application.

Referring now to FIG. 2, by way of example and without limitation, various aspects of the present disclosure are illustrated with reference to a Universal Mobile Telecommunications System (UMTS) system 200 employing a wideband code division multiple access (W-CDMA) air interface. A UMTS network includes three interacting domains: a Core Network (CN) 204, a UMTS Terrestrial Radio Access Network (UTRAN) 202, and User Equipment (UE) 210. In this example, the UTRAN 202 may provide various wireless services including telephony, video, data, messaging, broadcasts, and/or other services. The UTRAN 202 may include a plurality of Radio Network Subsystems (RNSs) such as the illustrated RNSs 207, each controlled by a respective Radio Network Controller (RNC) such as an RNC 206. Here, the UTRAN 202 may include any number of RNCs 206 and RNSs 207 in addition to the illustrated RNCs 206 and RNSs 207. The RNC 206 is an apparatus responsible for, among other things, assigning, reconfiguring and releasing radio resources within the RNSs 207. The RNC 206 may be interconnected to other RNCs (not shown) in the UTRAN 202 through various types of interfaces such as a direct physical connection, a virtual network, or the like, using any suitable transport network.

The geographic region covered by the RNSs 207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 208 are shown in each RNS 207; however, the RNSs 207 may include any number of wireless Node Bs. The Node Bs 208 provide wireless access points to a core network (CN) 204 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 210 may further include a universal subscriber identity module (USIM) 211, which contains a user's subscription information to a network. For illustrative purposes, one UE 210 is shown in communication with a number of the Node Bs 208. The downlink (DL), also called the forward link, refers to the communication link from a Node B 208 to a UE 210, and the uplink (UL), also called the reverse link, refers to the communication link from a UE 210 to a Node B 208.

The core network 204 interfaces with one or more access networks, such as the UTRAN 202. As shown, the core network 204 is a UMTS core network. However, as those skilled in the art will recognize, the various concepts presented throughout this disclosure may be implemented in a RAN, or other suitable access network, to provide UEs with access to types of core networks other than UMTS networks.

The illustrated UMTS core network 204 includes a circuit-switched (CS) domain and a packet-switched (PS) domain. Some of the circuit-switched elements are a Mobile services Switching Centre (MSC), a Visitor Location Register (VLR), and a Gateway MSC (GMSC). Packet-switched elements include a Serving GPRS Support Node (SGSN) and a Gateway GPRS Support Node (GGSN). Some network elements, like Equipment Identity Register (EIR), HLR, VLR and AuC may be shared by both of the circuit-switched and packet-switched domains.

In the illustrated example, the core network 204 supports circuit-switched services with a MSC 212 and a GMSC 214. In some applications, the GMSC 214 may be referred to as a media gateway (MGW). One or more RNCs, such as the RNC 206, may be connected to the MSC 212. The MSC 212 is an apparatus that controls call setup, call routing, and UE mobility functions. The MSC 212 also includes a visitor location register (VLR) that contains subscriber-related information for the duration that a UE is in the coverage area of the MSC 212. The GMSC 214 provides a gateway through the MSC 212 for the UE to access a circuit-switched network 216. The GMSC 214 includes a home location register (HLR) 215 containing subscriber data, such as the data reflecting the details of the services to which a particular user has subscribed. The HLR is also associated with an authentication center (AuC) that contains subscriber-specific authentication data. When a call is received for a particular UE, the GMSC 214 queries the HLR 215 to determine the UE's location and forwards the call to the particular MSC serving that location.

The illustrated core network 204 also supports packet-data services with a serving GPRS support node (SGSN) 218 and a gateway GPRS support node (GGSN) 220. GPRS, which stands for General Packet Radio Service, is designed to provide packet-data services at speeds higher than those available with standard circuit-switched data services. The GGSN 220 provides a connection for the UTRAN 202 to a packet-based network 222. The packet-based network 222 may be the Internet, a private data network, or some other suitable packet-based network. The primary function of the GGSN 220 is to provide the UEs 210 with packet-based network connectivity. Data packets may be transferred between the GGSN 220 and the UEs 210 through the SGSN 218, which performs primarily the same functions in the packet-based domain as the MSC 212 performs in the circuit-switched domain.

The UMTS air interface may be a spread spectrum Direct-Sequence Code Division Multiple Access (DS-CDMA) system. The spread spectrum DS-CDMA spreads user data through multiplication by a sequence of pseudo-random bits called chips. The W-CDMA air interface for UMTS is based on such DS-CDMA technology and additionally calls for a frequency division duplexing (FDD). FDD uses a different carrier frequency for the uplink (UL) and downlink (DL) between a Node B 208 and a UE 210. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles are equally applicable to a TD-SCDMA air interface.

A high speed packet access (HSPA) air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

Figure 3:
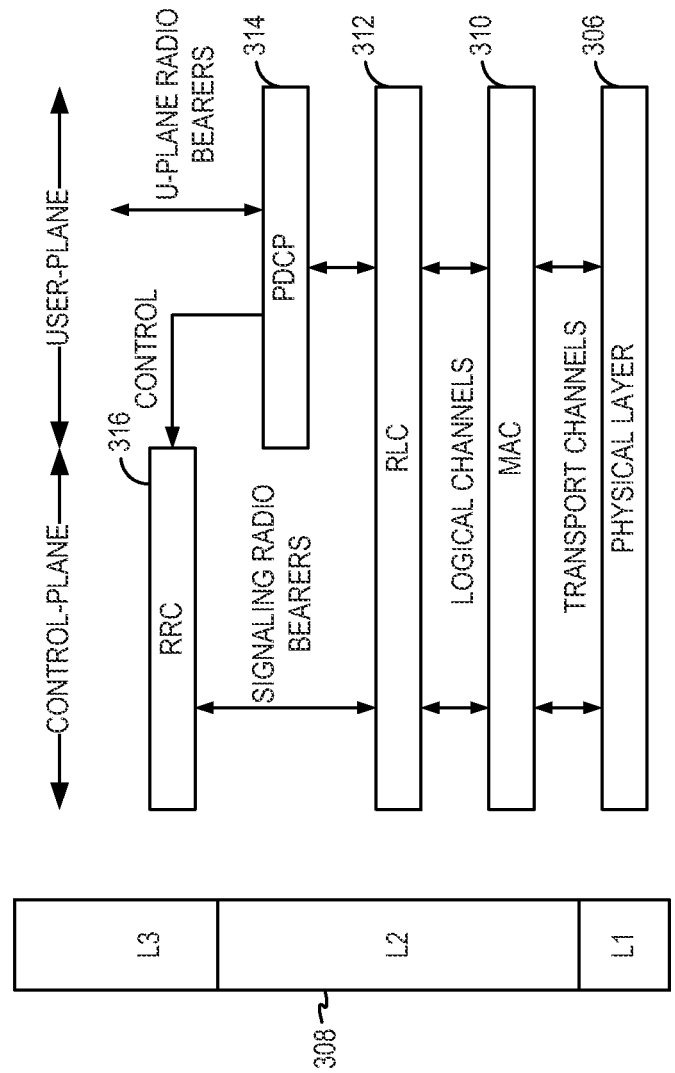
FIG. 3 is a conceptual diagram illustrating an example of a radio protocol architecture for a user plane and a control plane.

In a wireless telecommunication system, the radio protocol architecture between a mobile device and a cellular network may take on various forms depending on the particular application. An example for a 3GPP high-speed packet access (HSPA) system will now be presented with reference to FIG. 3, illustrating an example of the radio protocol architecture for the user and control planes between the UE 210 and the Node B 208. Here, the user plane or data plane carries user traffic, while the control plane carries control information, i.e., signaling.

Turning to FIG. 3, the radio protocol architecture for the UE 210 and Node B 208 is shown with three layers: Layer 1 (L1), Layer 2 (L2), and Layer 3 (L3). Although not shown, the UE 210 may have several upper layers above the L3 layer including a network layer (e.g., IP layer) that is terminated at a PDN gateway on the network side, and an application layer that is terminated at the other end of the connection (e.g., far end UE, server, etc.).

At Layer 3, the Radio Resource Control (RRC) layer 316 handles control plane signaling between the UE 210 and the Node B 208. RRC layer 316 includes a number of functional entities for routing higher layer messages, handling broadcast and paging functions, establishing and configuring radio bearers, etc.

The data link layer, called Layer 2 (L2 layer) 308 is between Layer 3 and the physical layer 306, and is responsible for the link between the UE 210 and Node B 208. In the illustrated air interface, the L2 layer 308 is split into sublayers. In the control plane, the L2 layer 308 includes two sublayers: a medium access control (MAC) sublayer 310 and a radio link control (RLC) sublayer 312. In the user plane, the L2 layer 308 additionally includes a packet data convergence protocol (PDCP) sublayer 314. Of course, those of ordinary skill in the art will comprehend that additional or different sublayers may be utilized in a particular implementation of the L2 layer 308, still within the scope of the present disclosure.

The PDCP sublayer 314 provides multiplexing between different radio bearers and logical channels. The PDCP sublayer 314 also provides header compression for upper layer data packets to reduce radio transmission overhead, security by ciphering the data packets, and handover support for UEs between Node Bs.

The RLC sublayer 312 provides segmentation and reassembly of upper layer data packets, retransmission of lost data packets, and reordering of data packets to compensate for out-of-order reception due to a hybrid automatic repeat request (HARQ).

The MAC sublayer 310 provides multiplexing between logical channels and transport channels. The MAC sublayer 310 is also responsible for allocating the various radio resources (e.g., resource blocks) in one cell among the UEs. The MAC sublayer 310 is also responsible for HARQ operations.

Layer 1 is the lowest layer and implements various physical layer signal processing functions. Layer 1 will be referred to herein as the physical layer (PHY) 306. At the PHY layer 306, the transport channels are mapped to different physical channels.

Data generated at higher layers, all the way down to the MAC sublayer 310, are carried over the air through transport channels. 3GPP Release 5 specifications introduced downlink enhancements referred to as HSDPA. HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries HARQ ACK/NACK signaling on the uplink to indicate whether a corresponding packet transmission was decoded successfully. That is, with respect to the downlink, the UE 210 provides feedback to the Node B 208 over the HS-DPCCH to indicate whether it correctly decoded a packet on the downlink.

HS-DPCCH further includes feedback signaling from the UE 210 to assist the Node B 208 in taking the right decision in terms of modulation and coding scheme and precoding weight selection, this feedback signaling including the channel quality indicator (CQI) and precoding control information (PCI).

3GPP Release 6 specifications introduced uplink enhancements referred to as Enhanced Uplink (EUL) or High Speed Uplink Packet Access (HSUPA). HSUPA utilizes as its transport channel the EUL Dedicated Channel (E-DCH). The E-DCH is transmitted in the uplink together with the Release 99 DCH. The control portion of the DCH, that is, the DPCCH, carries pilot bits and downlink power control commands on uplink transmissions. In the present disclosure, the DPCCH may be referred to as a control channel (e.g., a primary control channel) or a pilot channel (e.g., a primary pilot channel) in accordance with whether reference is being made to the channel's control aspects or its pilot aspects.

The E-DCH is implemented by physical channels including the E-DCH Dedicated Physical Data Channel (E-DPDCH) and the E-DCH Dedicated Physical Control Channel (E-DPCCH). In addition, HSUPA relies on additional physical channels including the E-DCH HARQ Indicator Channel (E-HICH), the E-DCH Absolute Grant Channel (E-AGCH), and the E-DCH Relative Grant Channel (E-RGCH).

Further, in accordance with aspects of the present disclosure, for HSUPA with multiple-input, multiple-output (MIMO) utilizing two transmit antennas, the physical channels include a Secondary E-DPDCH (S-E-DPDCH), a Secondary E-DPCCH (S-E-DPCCH), and a Secondary DPCCH (S-DPCCH). MIMO is a term generally used to refer to multi-antenna technology, that is, multiple transmit antennas (multiple inputs to the channel) and multiple receive antennas (multiple outputs from the channel). MIMO systems typically provide enhanced data transmission performance, enabling diversity gains to reduce multipath fading and increase transmission quality, and spatial multiplexing gains to increase data throughput.

Generally, for MIMO systems utilizing n transmit antennas, n transport blocks may be transmitted simultaneously over the same carrier utilizing the same channelisation code. Note that the different transport blocks sent over the n transmit antennas may have the same or different modulation and coding schemes from one another.

In summary, UMTS networks utilize a channel structure whereby logical channels (e.g., logical control and traffic channels for uplink and downlink traffic) are mapped to transport channels which are, in turn, mapped to the physical channels. Different frame structures, coding, and operating modes may be deployed depending on, for example, the traffic being carried and deployments decisions.

Discontinuous Reception (DRX)

Continuous packet connectivity (CPC) DRX is a feature that was introduced with a goal of increasing the battery life at the UE. In accordance with CPC DRX, a UE enters DRX mode if it doesn't receive a signal on a particular channel for a threshold period of time. For example, a UE can enter DRX mode if the UE doesn't receive any packets on a shared control channel (SCCH) packet for a DRX_Inactivity_Threshold number of subframes.

Upon entering DRX mode, the UE monitors the channel at designated intervals for any signals that the network may have sent during any of those designated intervals. For example, a UE may monitor the SCCH periodically (e.g., once every DRX_Cycle number of subframes).

The network operates on the same cycle count as the UE. In accordance with CPC DRX, if the network does not transmit a signal on the designated channel for a designated period of time, the network enters DRX mode. For example, the network may enter DRX mode if it doesn't transmit any SCCH packets for a DRX_Inactivity_Threshold number of subframes. Any subsequent SCCH packets that the network transmits will only be in those subframes that the UE monitors.

In accordance with CPC DRX, both the UE and the network exit the DRX mode (e.g., return to a mode where the UE always monitors the designated channel) upon transmission of an SCCH packet by the network on the designated channel. For example, a UE may exit the DRX mode if the UE decodes an SCCH packet. Similarly, the network may exit the DRX mode if the network transmits a SCCH packet.

DRX Synchronization

Though DRX is an optional feature and up to the implementation of the UE, if the feature is deployed, synchronization should be maintained between the network and the UE with respect to DRX operation (e.g., with respect to the DRX cycle). That is, for proper DRX operation, the UE enters DRX mode if the network has also entered DRX mode. If the network and UE are synchronized and both the network and UE are in DRX mode, the UE will be awake and receiving during times that the network is transmitting signals on the designated channel. If only one of the UE and network enter DRX mode or the UE and network are not synchronized, communication performance of the system can be negatively impacted. The latter situation is referred to herein as "off-synchronization" or "out-of-synchronization." Three scenarios of out-of-synchronization conditions between the network and the UE with respect to DRX operation are discussed in further detail below.

Figure 4:
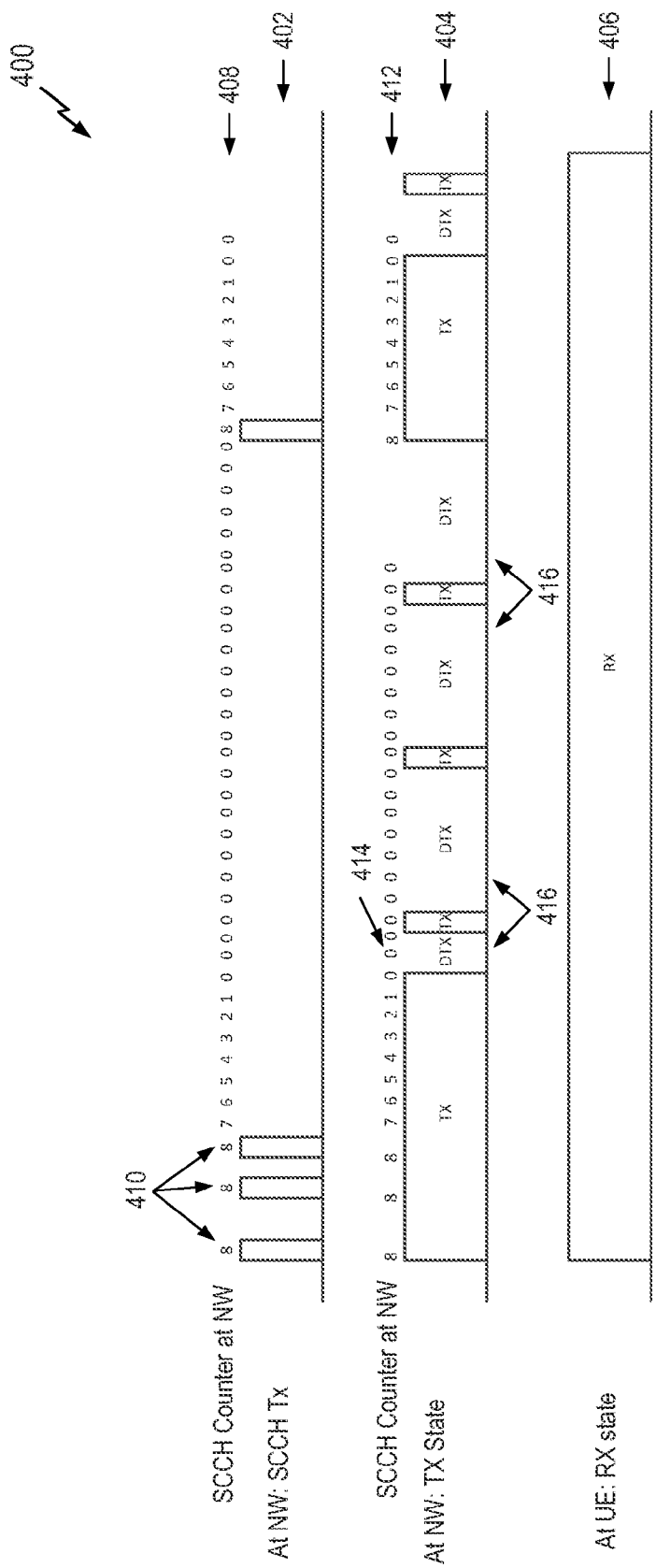
FIG. 4 is a timing diagram illustrating an example of a loss of DRX synchronization.

In a first scenario (Scenario 1), the UE has disabled DRX mode, but the network has enabled DRX mode. A simplified timing diagram 400 of such a scenario is illustrated in FIG. 4. The timing diagram 400 depicts transmit (TX) and receive (RX) operations at a network (NW) and a UE. Specifically, the timing diagram 400 illustrates network SCCH transmissions 402, the network transmit state 404, and the UE receive state 406.

An SCCH counter 408 is indicated for the network SCCH transmissions 402. In this example, the DRX Inactivity Threshold 410 is 8.

An SCCH counter 412 is also indicated for the network transmit state 404. Depending on the implementation, the counters 408 and 412 could be implemented using different counters or the same counter. As indicated by an arrow 414, the network enters DRX mode (DTX mode from the perspective of the network) after the SCCH counter expires. However, as indicated by the UE receive state 406 at this time, the UE does not enter DRX mode since DRX is disabled at the UE. Consequently, the UE misses out on power savings during the DRX subframes 416.

Figure 5:
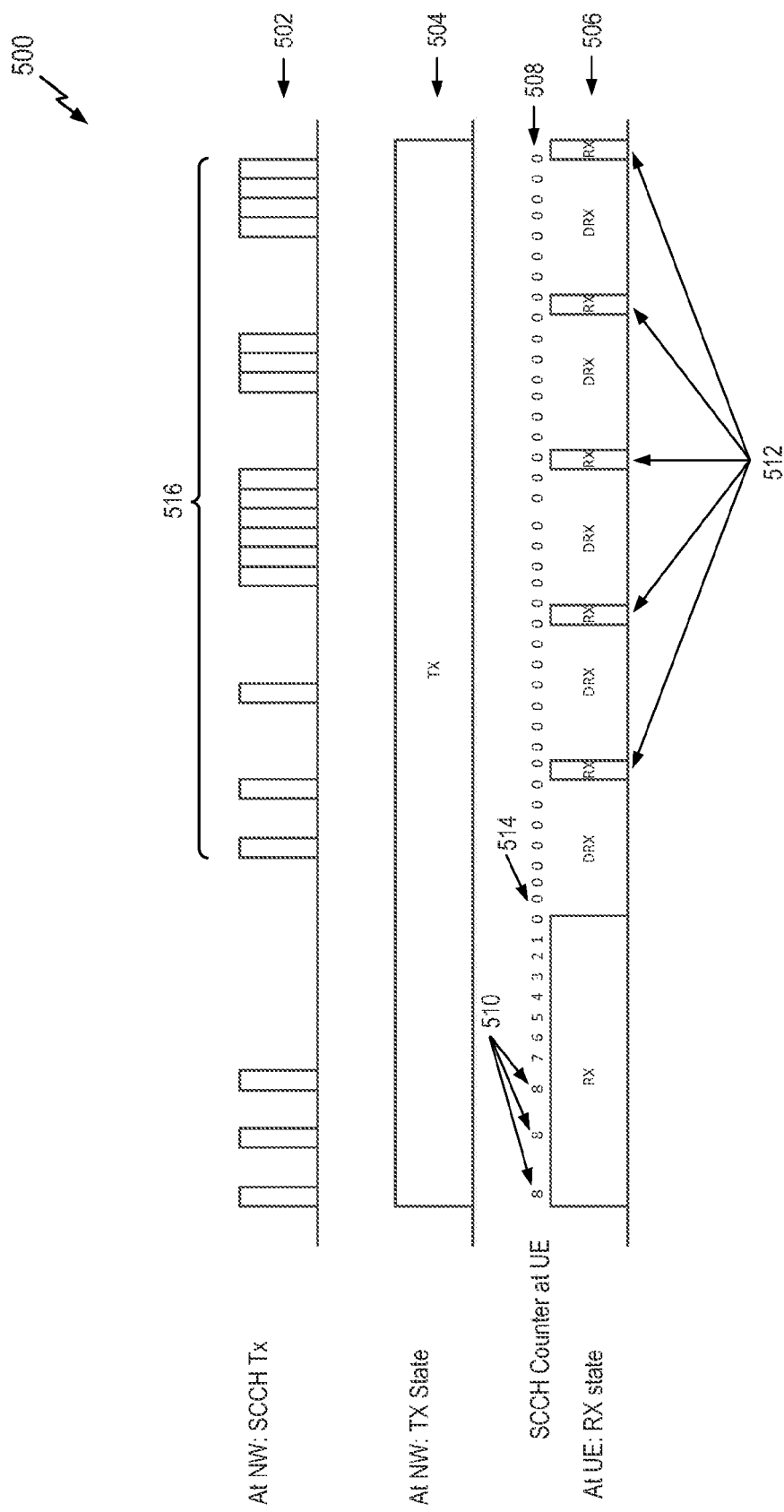
FIG. 5 is a timing diagram illustrating another example of a loss of DRX synchronization.

In a second scenario (Scenario 2), the UE has enabled DRX mode, but the network has disabled DRX mode. A simplified timing diagram 500 of such a scenario is illustrated in FIG. 5. The timing diagram 500 depicts transmit (TX) and receive (RX) operations at a network (NW) and a UE. Specifically, the timing diagram 500 illustrates network SCCH transmissions 502, the network transmit state 504, and the UE receive state 506.

An SCCH counter 508 is indicated for the UE receive state 506. Again, the DRX Inactivity Threshold 510 is 8. This example illustrates a DRX cycle length of 8. Thus, when in DRX mode, the UE monitors every eighth SCCH subframe 512.

As indicated by an arrow 514, the UE enters DRX mode after the SCCH counter expires. However, as indicated by the network transmit state 504 at this time, the network does not enter DRX mode since DRX mode is disabled at the network. Consequently, the UE misses the indicated SCCH transmit packets 516 since these transmissions occur during subframes when the UE is in DRX mode.

Figure 6:
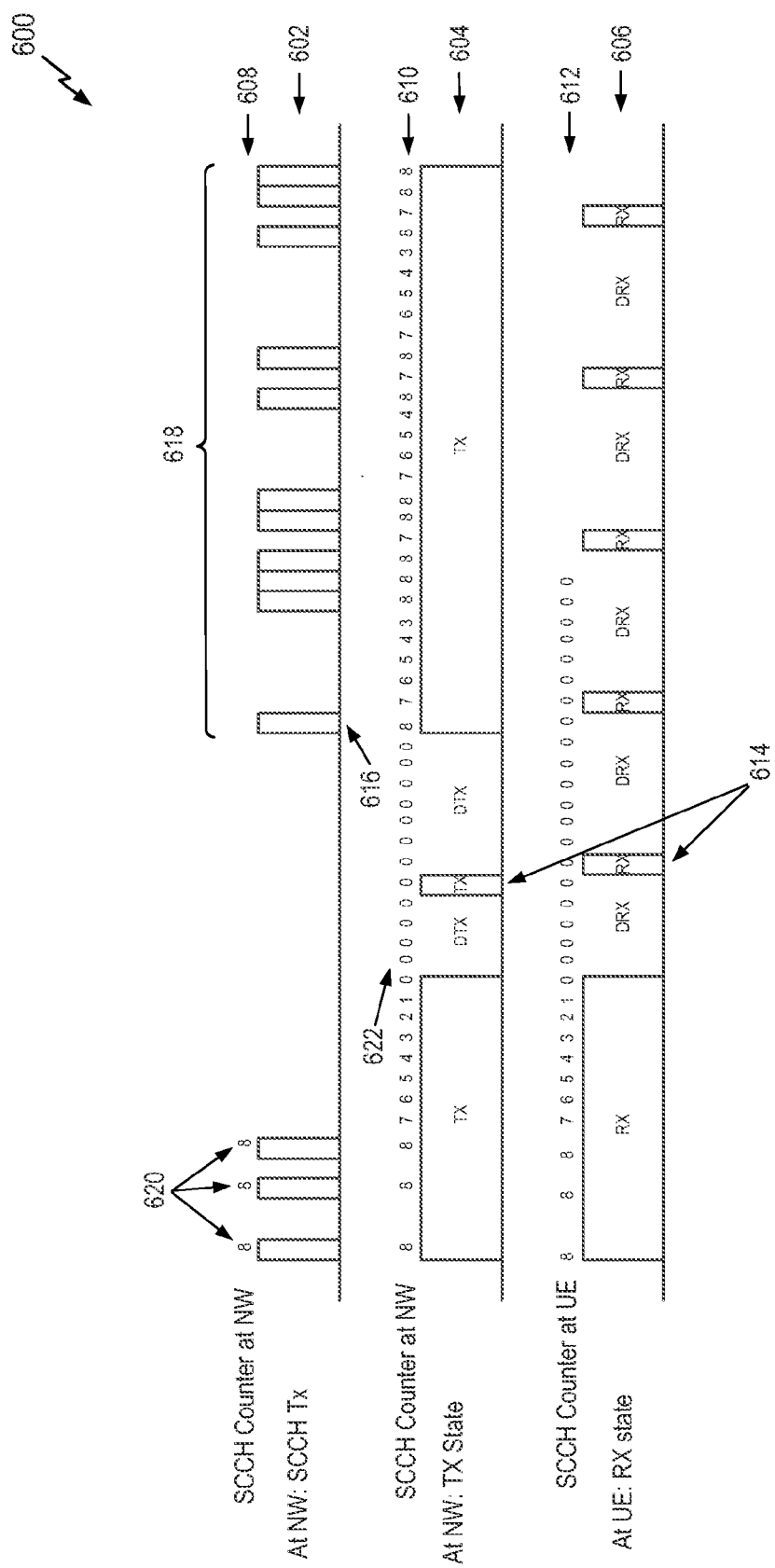
FIG. 6 is a timing diagram illustrating another example of a loss of DRX synchronization.

In a third scenario (Scenario 3), both the UE and the network have enabled DRX mode; however, their respective receive subframe indexes are different. That is, the subframes during which the network transmits and the UE receives are not the same when the network and UE operate in DRX mode. A simplified timing diagram 600 of such a scenario is illustrated in FIG. 6. The timing diagram 600 depicts transmit (TX) and receive (RX) operations at a network (NW) and a UE. Specifically, the timing diagram 600 illustrates network SCCH transmissions 602, the network transmit state 604, and the UE receive state 606.

An SCCH counter 608 is indicated for the network SCCH transmissions 602. Again, the DRX Inactivity Threshold 620 is 8.

An SCCH counter 610 is also indicated for the network transmit state 604. As indicated by an arrow 622, the network and the UE enter DRX mode (DTX mode from the perspective of the network) after the SCCH counter expires. However, as indicated by the arrows 614, the UE and the network wake up in different subframes.

As indicated by an arrow 616, for some subframes 618, the network wakes up for a scheduled DRX SCCH transmission while the UE is still in DRX mode. Thus, the UE misses the indicated SCCH transmit packets 618 since these transmissions occur during subframes when the UE is in DRX mode.

There can be several reasons for such out-of-synchronization behavior between the network and the UE with respect to DRX operation. Four examples of such reasons follow.

A loss of synchronization may be due to a missed control channel order at the UE or a control channel order false positive at the UE. For example, a UE might not have received an SCCH Order (e.g., indicating whether DRX is to be enabled at the UE) sent by the network. As another example, a UE might have a false positive on an SCCH Order. That is, the UE may have received information that the UE interpreted as being a particular SCCH Order, but the network had not actually sent that SCCH Order.

A loss of synchronization may result from missed higher layer signaling at the UE. For example, a UE might not have received a higher layer (e.g., above layer 3) message that indicated whether DRX is to be enabled at the UE.

A loss of synchronization may be the result of a control channel not being decoded by the network. For example, a high speed dedicated physical control channel (HS-DPCCH) might not have been decoded at a NodeB due to low transmit power at the UE. This low UE transmit power could be the result of, for example, the presence of a stronger neighbor cell.

A loss of synchronization may be the result of a control channel not being transmitted due to an out-of-synchronization (OOS) condition. For example, HS-DPCCH might not have been transmitted due an out-of-synchronization condition that exists because the UE power amplifier (PA) is turned off.

Out of the three out-of-synchronization scenarios discussed above, the first scenario is not catastrophic. As seen in FIG. 4, the primary consequence of this scenario would be reduced power savings at the UE due to the DRX operation.

However, the second and the third scenarios can be problematic. As seen in FIG. 5 and FIG. 6, the network can send important data in those subframes where UE is in DRX state (e.g., for the packets 516 and 618). This situation is problematic in that it can lead to call drops. A noticeably higher call drop rate has been seen with CPC enabled versus CPC disabled. Moreover, log analysis indicates that CPC DRX may be a significant factor in the increase in call drops.

Temporarily Disabling DRX

The disclosure relates in some aspects to techniques for handling CPC DRX cycles in a manner that improves UE-network DRX synchronization and other aspects of call performance. FIGS. 7-11 illustrate various aspects of a DRX synchronization scheme according to the present disclosure. For purposes of illustration, and without limitation, these aspects of the disclosure may be described in the context of a UMTS-based network where a Node B serves a UE. It should be appreciated that the disclosed aspects may be applicable to other types of apparatuses (e.g., evolved Node Bs, eNode Bs) and other technology (e.g., an LTE-based network).

Figure 7:
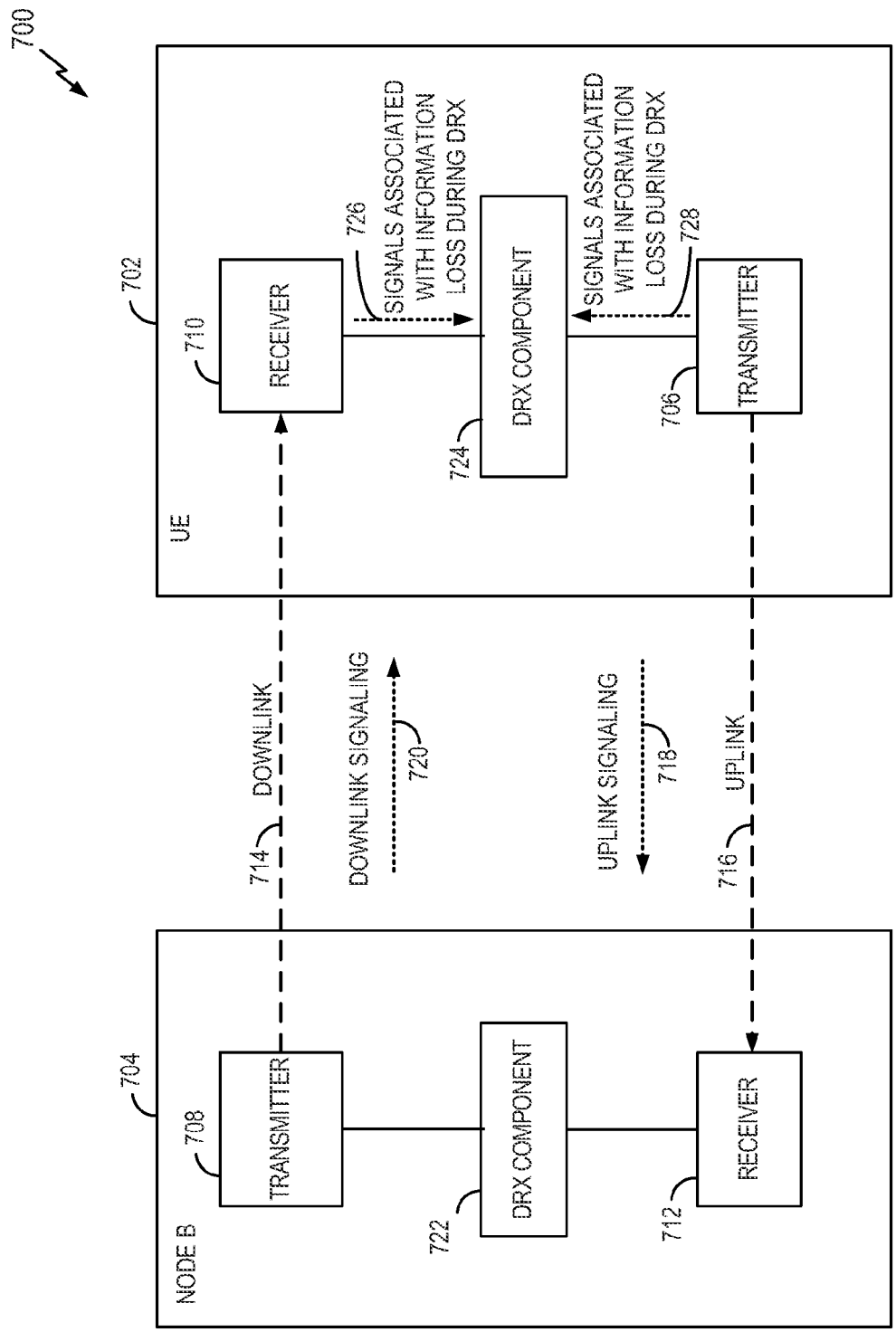
FIG. 7 is a block diagram illustrating detecting information loss during DRX in accordance with some aspects of the disclosure.

In the communication system 700 of FIG. 7, a UE 702 is served by a Node B 704. The UE 702 and the Node B 704 include respective transmitters 706 and 708 and receivers 710 and 712 for supporting communicating via a downlink (DL) 714 and an uplink (UL) 716 as indicated. That is, the UE 702 transmits UL signaling 718 to the Node B 704 and the Node B transmits DL signaling 720 to the UE 702.

At some point in time, a DRX component 722 of the Node B instructs the UE 702 to enter DRX mode (e.g., by sending an appropriate signal to the UE via the downlink signaling 720). For example, the Node B may transmit a radio bearer reconfiguration (RBR) message that configures CPC discontinuous transmission (DTX) and discontinuous reception (DRX). As another example, the Node B may transmit an SCCH Order that configures DRX. In some aspects, configuration of DRX may involve specifying whether DRX is to be enabled or disabled. Also (e.g., for an RBR Setup message), configuration of DRX may involve specifying the DRX_Inactivity_Threshold and the subframe(s) to be used during DRX.

The UE 702 includes a DRX component 724 that controls DRX operations at the UE 702. In response to an appropriate message from the Node B, the DRX component 724 enables DRX at the UE 702. In accordance with the teachings herein, the DRX component 724 may temporarily disable DRX in the event DRX is compromising or may compromise communication at the UE 702. For example, the DRX component 724 may detect whether the UE 702 and the Node B 704 are out-of-synchronization with respect to DRX. As discussed herein, in some implementations, this out-of-synchronization condition relates to Scenario 2 or Scenario 3. Given that the Scenario 1 out-of-synchronization condition is less problematic as discussed above, the DRX component 724 does not detect Scenario 1 in the examples that follow. However, as discussed herein, the out-of-synchronization condition may relate to a scenario other than Scenario 1, 2, or 3 where DRX is affecting or could affect communication at the UE 702.

To this end, the DRX component 724 receives signals that are associated with (e.g., indicative of) a loss of information during DRX at the UE 702. For example, signals associated with information loss during DRX 726 received from the receiver 710 can include RLC signals, HS-PDSCH signals, E-DCH signals, E-HICH signals, signal radio bearer (SRB) traffic signals, signals indicative of a poor radio frequency (RF) condition, or signals indicative of a low signal-to-interference estimate (SIRE). As another example, signals associated with information loss during DRX 728 received from the transmitter 706 can include signals indicative of low transmit power.

With respect to Scenarios 2 and 3, the disclosure relates in some aspects to a UE first detecting the possibility of the UE and the network not being in synchronization, and then attempting to re-synchronize the UE and the network (e.g., with respect to DRX being enabled/disable or with respect to the network cycle count (e.g., subframe count)). A two-step procedure will now be described where, first, the out-of-synchronization condition (Scenario 2 or Scenario 3) is detected and, second, an attempt is made to rectify the condition.

For purposes of illustration, this two-step procedure will be described in the context of the system 700 where the DRX component 724 of the UE 702 performs the detection and rectification operations. It should be appreciated, however, that this procedure could be performed by an entity other than a UE. Moreover, in different implementations, the DRX component 724 may be a stand-alone component (e.g., a processing circuit and/or software component) or incorporated into another component such as a processor, an RF transceiver, or some other type of circuit.

Step 1—Detect Scenario 2 or Scenario 3

Figure 8:
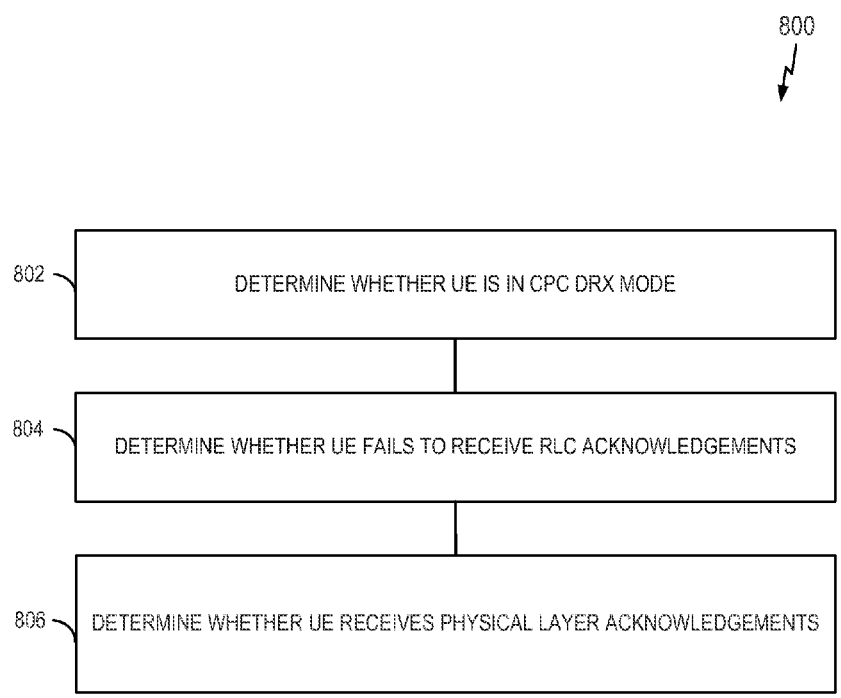
FIG. 8 is a flowchart illustrating an example of a process of detecting loss of DRX synchronization in accordance with some aspects of the disclosure.

An out-of-synchronization condition associated with either Scenario 2 or Scenario 3 is deemed detected if all of the conditions 800 set forth in FIG. 8 are satisfied. Thus, the DRX component 724 detects the conditions 800 to determine whether a UE and a serving base station are out-of-synchronization with respect to DRX.

Various triggers can be used to initiate the detection of the conditions 800 of FIG. 8. In some implementations, a UE repeatedly (e.g., periodically) monitors for the conditions 800. In some implementations, a drop in communication performance at a UE will cause the UE to monitor the conditions 800. For example, if a UE observes an increase in packet error rate during standard quality of service (QoS) procedures, the UE may detect the conditions 800 to determine whether the increase in packet error rate is due to a DRX out-of-synchronization condition.

Block 802 of FIG. 8 corresponds to a first condition where the DRX component 724 determines whether the UE is in CPC DRX mode. If the UE is in CPC DRX mode, the DRX component 724 proceeds to check the second condition set forth below. If the UE is not in CPC DRX mode, the DRX component 724 terminates the detection operation. Thus, in this example, the DRX component 724 does not detect a Scenario 1 out-of-synchronization condition or any other condition where DRX is disabled.

Block 804 corresponds to a second condition where the DRX component 724 determines whether the UE failed to receive RLC (e.g., Layer 2) acknowledgements (ACKs) on a given number (N) of continuous UL transmissions for either signaling protocol data units (PDUs) or data PDUs. For example, in some implementations, the UE expects to receive physical layer data on the HS-PDSCH. A UE's failure to receive this information could be the result of an out-of-synchronization DRX condition (Scenario 2 or 3). Thus, upon determining that the UE has not received RLC acknowledgements, the DRX component 724 proceeds to check the third condition.

Block 806 corresponds to the third condition where the DRX component 724 determines whether the UE received physical layer ACKs on E-HICH transmissions for an UL E-DCH transmission corresponding to UL signaling PDUs. These transmissions are not affected by DRX mode. Thus, if the DRX component 724 determines at block 806 that these physical layers ACKs are being received while the UE is operating in DRX mode and determines at block 804 that the higher layer RLC ACKs are not being received while the UE is operating in DRX mode, the DRX component 724 will generate an indication that there is an out-of-synchronization DRX condition (Scenario 2 or 3).

The second step of the two-step procedure involves solving the out-of-synchronization DRX condition. Initially, the DRX component 724 temporarily disables DRX at the UE and waits for instructions from the network. This is referred to as Step 2a. In implementations that are only concerned with resolving Scenario 2, the DRX component 724 only performs Step 2a. In implementations that are concerned with resolving Scenario 3, the DRX component 724 also determines whether DRX counters at the UE and network are out-of-synchronization and, if so, takes action to resolve this condition. This is referred to as Step 2b. In some implementations, the DRX component 724 attempts to resolve both Scenario 2 and Scenario 3 conditions by performing both Step 2a and Step 2b.

Step 2a—Attempt to Solve the Condition for Scenario 2

An example of operations 900 that may be employed to solve a Scenario 2 condition will now be described with reference to FIG. 9. In implementations that are configured to resolve the Scenario 2 condition, the DRX component 724 invokes the operations of Step 2a if the DRX component detects an out-of-synchronization condition at Step 1.

Figure 9:
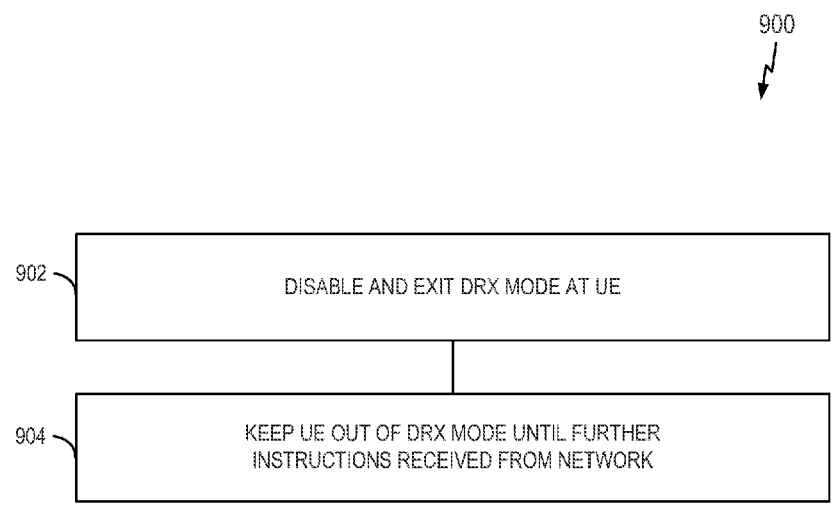
FIG. 9 is a flowchart illustrating an example of a process of DRX synchronization in accordance with some aspects of the disclosure.

In block 902 of FIG. 9, the DRX component 724 disables and exits DRX mode at the UE to avoid any further loss in DL transmission.

In some implementations, to temporarily deactivate DRX mode at the UE, the DRX component 724 "fakes" a higher layer signaling message or an SCCH Order at the UE. For example, in some implementations, a higher protocol layer component (e.g., a software component) of the DRX component 724 that identifies an occurrence of Scenario 2 or Scenario 3 can send a "fake" higher level message to a lower protocol layer component (e.g., a software component) of the DRX component 724 that is configured to enable and disable DRX based on received messages (which normally would come from the network).

In block 904, the DRX component 724 continues to keep the UE out of DRX mode until the DRX component receives further instructions from the network regarding DRX mode. For example, the DRX component 724 may keep DRX disabled until the DRX component receives either an RBR message or an SCCH Order that indicates that the UE is to enable DRX.

In the event the network was actually in DRX mode when the DRX component 724 disabled DRX mode at the UE, the UE will end up losing out on potential DRX power savings. This will continue until the network sends the next SCCH Order or RBR message instructing the UE to enable DRX.

Detailed Example of Scenario 2

Figure 10:
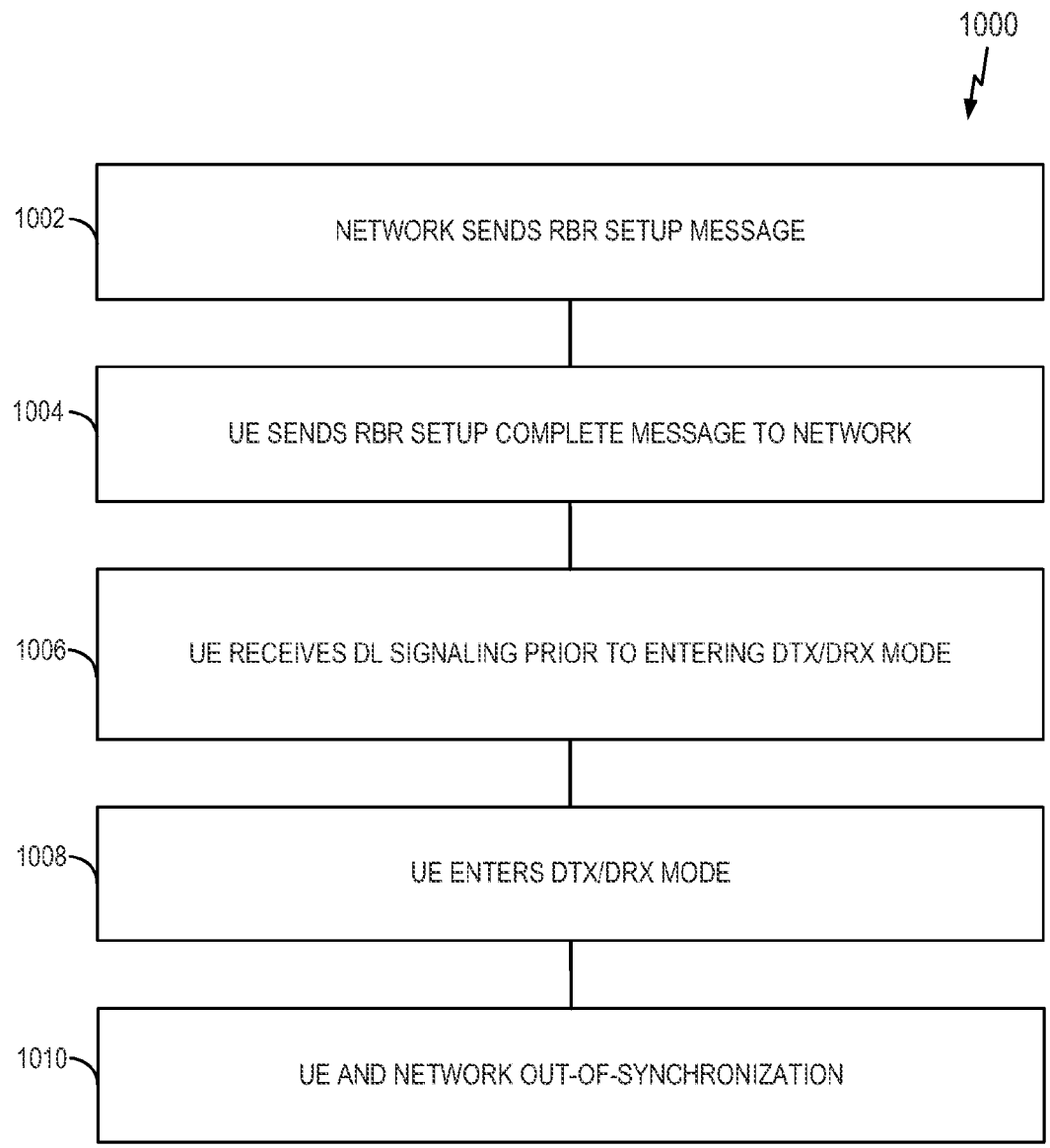
FIG. 10 is a flowchart illustrating an example of a DRX process.

To facilitate further understanding of Scenario 2, FIG. 10 illustrates a detailed example of operations 1000 that may result in a Scenario 2 condition.

As represented by block 1002 of FIG. 10, the network sends an RBR Setup message to the UE instructing the UE to configure CPC DTX/DRX.

As represented by block 1004, after configuring CPC DTX/DRX according to the RBR Setup message received at block 1002, the UE sends an RBR Setup Complete message to the network. After the network ACKs this message, the UE can subsequently enter the DTX/DRX mode, if desired, as discussed at block 1008 below.

As represented by block 1006, prior to the UE entering DRX mode, the UE receives DL signaling PDUs sent by the network.

The UE enters DRX mode at block 1008. At some point in time after the UE enters DRX mode, the UE stops receiving the ACKs sent by the network for the UL signaling and Data PDUs due to a Scenario 2 out-of-synchronization condition (block 1010). For example, even though the UE has enabled the DRX mode, it is possible that the network assumes that the UE is not in DRX mode and continues to send the ACKs in the non-DRX frames. The UE repeatedly sends the signaling PDU expecting an ACK, thereby preventing the network from entering the DRX mode since the network is transmitting the ACK.

Several examples of factors that tend to confirm that the network is not in DRX and the UE is in DRX follow. The DRX component 724 may thus monitor one or more of these factors to determine whether there is a Scenario 2 DRX out-of-synchronization condition.

In some implementations, the DRX component 724 monitors transmission sequence numbers (TSNs) of received packets just before entering the DRX mode and just after exiting the DRX mode to determine whether there is a DRX out-of-synchronization condition. In the event there is a DRX out-of-synchronization condition, the TSN numbers corresponding to the signaling PDUs would be missing. This may result from the network not sending the UE ACKs for the DL signaling PDUs during the UEs DRX gaps that weren't received by the UE.

In some implementations, the DRX component 724 monitors received signaling at the UE to determine whether Physical Layer ACKs corresponding to the missing RRC Signaling ACKs have been received through HICH. A UE's receipt of ACKs on HICH but not on the Physical Layer may serve to indicate that there is a DRX out-of-synchronization condition.

In some implementations, the DRX component 724 monitors received signaling at the UE to determine whether the UE has received SCCH Orders. A UE's failure to receive an SCCH Order may be indicative of a DRX out-of-synchronization condition.

In some implementations, the DRX component 724 monitors the SIR threshold (SIRT) being used by the UE and the signal-to-interference estimates (SIREs) generated by the UE. A scenario where the SIREs tend to follow the SIRT (e.g., higher SIRT results in a higher SIRE), and where the SIRT is a relatively high value (e.g., greater than or equal to a defined threshold value) may be indicative of a DRX out-of-synchronization condition.

In some implementations, the DRX component 724 monitors the finger strength for a RAKE receiver of the UE to determine whether there is such a DRX out-of-synchronization condition. Here, the UE's use of a relatively high finger strength (e.g., greater than or equal to a defined threshold value) may be indicative of a DRX out-of-synchronization condition.

Step 2b—Attempt to Solve the Condition for Scenario 3

An example of Step 2b operations 1100 that may be employed to solve a Scenario 3 condition will now be described with reference to FIG. 11. In implementations where the DRX component 724 is configured to resolve the Scenario 3 condition, the DRX component 724 invokes the operations 1100 if the DRX component detects an out-of-synchronization condition at Step 1. In general, the operations 1100 involve configuring a UE to get back to using the same wake-up subframe as the network. As Scenario 3 may be considered a subframe offset condition, the following may be referred to as a DTX/DRX-offset learning algorithm.

Figure 11:
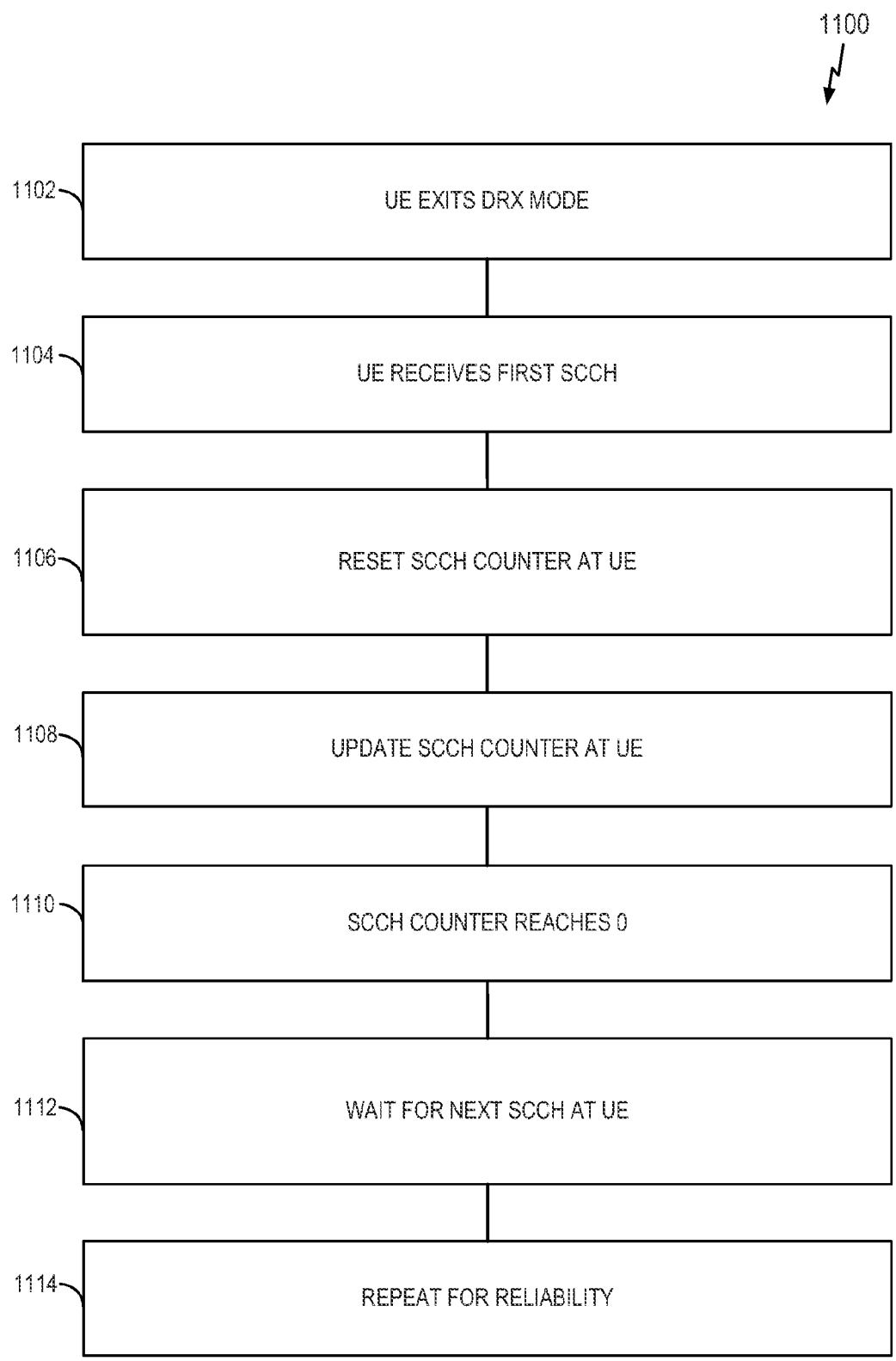
FIG. 11 is a flowchart illustrating an example of an offset learning algorithm in accordance with some aspects of the disclosure.

In block 1102 of FIG. 11, the UE exits DRX mode. That is, once the DRX component 724 detects an out-of-synchronization condition, the DRX component 724 disables DRX at the UE.

In block 1104, the DRX component 724 waits until the UE receives the first SCCH packet after exiting DRX mode.

In block 1106, the DRX component 724 resets the SCCH_Counter at the UE to DRX_Inactivity_Threshold upon receipt of the SCCH packet in block 1104. At this point, both the network and the UE are out of DRX mode and have the same SCCH_Counter.

In block 1108, the DRX component 724 updates the SCCH_Counter at the UE in the conventional manner. Thus, the DRX component 724 configures the SCCH_Counter to decrement by 1 for every subframe without an SCCH, and the DRX component 724 resets the SCCH_Counter to DRX_Inactivity_Threshold if the DRX component 724 determines that the UE has received a valid SCCH subframe.

In block 1110, once the SCCH_Counter reaches 0 (i.e., the counter expires); the network will have entered DRX mode. However, the DRX component 724 does not yet configure the UE to enter DRX mode since the DRX component 724 does not know the subframe location within which the network will send the next SCCH packet in DRX mode. Thus, the UE remains out of DRX mode despite the expiration of the SCCH_Counter.

Accordingly, in block 1112, the DRX component 724 waits until the UE receives the next SCCH packet. Once the UE receives this SCCH packet, the DRX component 724 stores the corresponding subframe number at the UE. This will give the subframe position within the DRX cycle length that the network uses to send SCCH packets when the network is in DRX mode. If this subframe is the same as the subframe being used by the UE, then a Scenario 3 condition is not present, and the DRX component 724 terminates this process. However, if this subframe is not the same as the subframe being used by the UE, then a Scenario 3 condition is present, and the DRX component 724 updates the subframe being used by the UE to match the one being used by the network.

In block 1114, a repetition of blocks 1106-1112 is invoked a number of times to achieve a reliable indication of the subframe being used by the network.

Other Scenarios

The above proposed solutions primarily involve the DRX component 724 disabling DRX mode at a UE for a certain duration in an attempt to be cautious and not miss any further important messages. Likewise, the DRX component 724 can temporarily disable DRX for other troubled/vulnerable scenarios where calls can be jeopardized. Several examples of these other scenarios follow.

In some implementations, the DRX component 724 temporarily disables DRX at a UE if there is missing signaling radio bearer (SRB) traffic at the UE. For example, the DRX component 724 may disable DRX at the UE after configuring DRX, or after an important state transition to ensure that SRB traffic is received.

In some implementations, the DRX component 724 temporarily disables DRX at a UE if the UE is in too poor of an RF condition (e.g., low RF) or a low signal-to-interference estimate (SIRE) has been detected. In this case, the DRX component 724 disables DRX at the UE to facilitate F-DPCH (power control tracking) and RAKE tracking.

In some implementations, the DRX component 724 temporarily disables DRX at a UE if the DRX component 724 determines that transmit power of the UE is too low, determines that transmit power of the UE has suddenly gone low, or detects an out-of-synchronization artifact. In this case, the DRX component 724 may disable DRX at the UE to ensure that the UE does not miss any transmit power control (TPC) commands indicating that the UE should increase its transmit power (e.g., in a situation where the network might be expected to send such a command in the near future). Such a TPC command could be missed, for example, due to a mismatch with the network.

For the above scenarios, the DRX component 724 may recommence normal DRX operations at the UE, for example, once the UE receives an expected signal (e.g., SRB, TPC, etc.).

Example Apparatus

Figure 12:
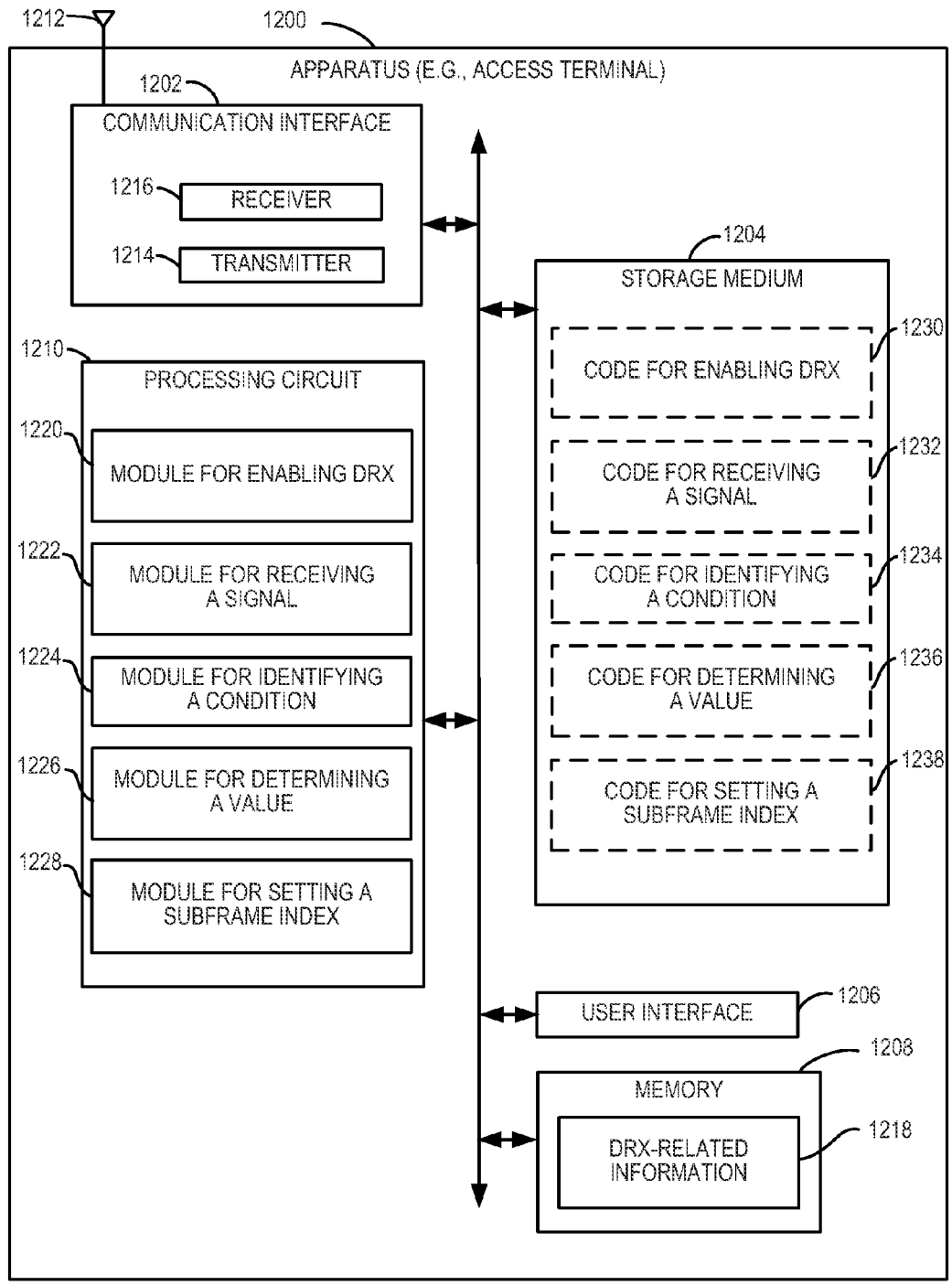
FIG. 12 is a block diagram illustrating select components of an apparatus configured to implement conditional disabling of DRX in accordance with some aspects of the disclosure.

FIG. 12 is an illustration of an apparatus 1200 (e.g., an access terminal such as the UE 702 of FIG. 7) configured according to one or more aspects of the disclosure. The apparatus 1200 includes a communication interface (e.g., at least one transceiver) 1202, a storage medium 1204, a user interface 1206, a memory 1208, and a processing circuit 1210.

These components can be coupled to and/or placed in electrical communication with one another via a signaling bus or other suitable component, represented generally by the connection lines in FIG. 12. The signaling bus may include any number of interconnecting buses and bridges depending on the specific application of the processing circuit 1210 and the overall design constraints. The signaling bus links together various circuits such that each of the communication interface 1202, the storage medium 1204, the user interface 1206, and the memory 1208 are coupled to and/or in electrical communication with the processing circuit 1210. The signaling bus may also link various other circuits (not shown) such as timing sources, peripherals, voltage regulators, and power management circuits, which are well known in the art, and therefore, will not be described any further.

The communication interface 1202 may be adapted to facilitate wireless communication of the apparatus 1200. For example, the communication interface 1202 may include circuitry and/or programming adapted to facilitate the communication of information bi-directionally with respect to one or more communication devices in a network. The communication interface 1202 may be coupled to one or more antennas 1212 for wireless communication within a wireless communication system. The communication interface 1202 can be configured with one or more standalone receivers and/or transmitters, as well as one or more transceivers. In the illustrated example, the communication interface 1202 includes a transmitter 1214 and a receiver 1216. In some aspects, the transmitter 1214 may correspond to the transmitter 706 of FIG. 7. In some aspects, the receiver 1216 may correspond to the receiver 710 of FIG. 7.

The memory 1208 may represent one or more memory devices. As indicated, the memory 1208 may maintain DRX-related information 1218 along with other information used by the apparatus 1200. In some implementations, the memory 1208 and the storage medium 1204 are implemented as a common memory component. The memory 1208 may also be used for storing data that is manipulated by the processing circuit 1210 or some other component of the apparatus 1200.

The storage medium 1204 may represent one or more computer-readable, machine-readable, and/or processor-readable devices for storing programming, such as processor executable code or instructions (e.g., software, firmware), electronic data, databases, or other digital information. The storage medium 1204 may also be used for storing data that is manipulated by the processing circuit 1210 when executing programming. The storage medium 1204 may be any available media that can be accessed by a general purpose or special purpose processor, including portable or fixed storage devices, optical storage devices, and various other mediums capable of storing, containing or carrying programming.

By way of example and not limitation, the storage medium 1204 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The storage medium 1204 may be embodied in an article of manufacture (e.g., a computer program product). By way of example, a computer program product may include a computer-readable medium in packaging materials. In view of the above, in some implementations, the storage medium 1204 may be a non-transitory (e.g., tangible) storage medium.

The storage medium 1204 may be coupled to the processing circuit 1210 such that the processing circuit 1210 can read information from, and write information to, the storage medium 1204. That is, the storage medium 1204 can be coupled to the processing circuit 1210 so that the storage medium 1204 is at least accessible by the processing circuit 1210, including examples where at least one storage medium is integral to the processing circuit 1210 and/or examples where at least one storage medium is separate from the processing circuit 1210 (e.g., resident in the apparatus 1200, external to the apparatus 1200, distributed across multiple entities, etc.).

Programming stored by the storage medium 1204, when executed by the processing circuit 1210, causes the processing circuit 1210 to perform one or more of the various functions and/or process operations described herein. For example, the storage medium 1204 may include operations configured for regulating operations at one or more hardware blocks of the processing circuit 1210, as well as to utilize the communication interface 1202 for wireless communication utilizing their respective communication protocols.

The processing circuit 1210 is generally adapted for processing, including the execution of such programming stored on the storage medium 1204. As used herein, the term "programming" shall be construed broadly to include without limitation instructions, instruction sets, data, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 1210 is arranged to obtain, process and/or send data, control data access and storage, issue commands, and control other desired operations. The processing circuit 1210 may include circuitry configured to implement desired programming provided by appropriate media in at least one example. For example, the processing circuit 1210 may be implemented as one or more processors, one or more controllers, and/or other structure configured to execute executable programming. Examples of the processing circuit 1210 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 1210 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 1210 are for illustration and other suitable configurations within the scope of the disclosure are also contemplated.

According to one or more aspects of the disclosure, the processing circuit 1210 may be adapted to perform any or all of the features, processes, functions, operations and/or routines for any or all of the apparatuses described herein. As used herein, the term "adapted" in relation to the processing circuit 1210 may refer to the processing circuit 1210 being one or more of configured, employed, implemented, and/or programmed to perform a particular process, function, operation and/or routine according to various features described herein. In some aspects, the processing circuit 1210 may incorporate the functionality of the DRX component 724 of FIG. 7. Accordingly, the processing circuit 1210 may perform any of the operations of FIGS. 8-11.

According to at least one example of the apparatus 1200, the processing circuit 1210 may include one or more of a module for enabling DRX 1220, a module for receiving a signal 1222, a module for identifying a condition 1224, a module for determining a value 1226, and a module for setting a subframe index 1228. In some implementations, the module for enabling DRX 1220, the module for receiving a signal 1222, the module for identifying a condition 1224, the module for determining a value 1226, and the module for setting a subframe index 1228 correspond, at least in part, to the DRX component 724 of FIG. 7.

The module for enabling DRX 1220 may include circuitry and/or programming (e.g., code for enabling DRX 1230 stored on the storage medium 1204) adapted to perform several functions relating to, for example, enabling and/or disabling DRX mode at the apparatus 1200. The module for enabling DRX 1220 determines whether DRX is to be enabled. For example, upon detection of a network that supports DRX, DRX may be enabled to reduce power consumption at the apparatus 1200. As a result of this determination, the module for enabling DRX 1220 invokes DRX functionality by, for example, setting a flag or other parameter(s) to cause the apparatus to monitor for received information (e.g., SCCH packets) and enter a DRX mode in the absence of such information over a designated period of time (e.g., based on an SCCH counter). In some implementations, the module for enabling DRX 1220 disables DRX upon identification of a condition associated with loss of information when DRX is enabled. In some implementations, the module for enabling DRX 1220 keeps DRX disabled until an indication to enable DRX is received.

The module for receiving a signal 1222 may include circuitry and/or programming (e.g., code for receiving a signal 1232 stored on the storage medium 1204) adapted to perform several functions relating to, for example, receiving packets and/or other transmissions. Initially, the module for receiving a signal 1222 obtains received information. For example, the module for receiving a signal 1222 may obtain this data directly from a component of the apparatus (e.g., the receiver 1216 or some other component). In some implementations, the module for receiving a signal 1222 processes (e.g., decodes) the received information. The module for receiving a signal 1222 then outputs the received information (e.g., stores the data in the memory 1208 or sends the information to another component of the apparatus 1200).

The module for identifying a condition 1224 may include circuitry and/or programming (e.g., code for identifying a condition 1234 stored on the storage medium 1204) adapted to perform several functions relating to, for example, identifying a DRX out-of-synchronization condition when DRX is enabled and/or identifying a condition associated with loss of information when DRX is enabled. In some implementations, the module for identifying a condition 1224 identifies the condition based on the signal received by the module for receiving a signal 1222. For example, such a signal may be indicative of one entity having DRX disabled while another entity has DRX disabled. As another example, such a signal may indicative of one entity used one DRX subframe index while another entity uses a different DRX subframe index. Upon identifying the condition, the module for identifying a condition 1224 generates an indication of this condition and outputs the indication (e.g., stores the indication in the memory 1208 or sends the indication to another component of the apparatus 1200).

The module for determining a value 1226 may include circuitry and/or programming (e.g., code for determining a value 1236 stored on the storage medium 1204) adapted to perform several functions relating to, for example, determining the value of a subframe index being used by a serving base station for DRX. In some implementations, the module for determining a value 1226 obtains a signal transmitted by the serving base station, and identifies the subframe index from the received signal (e.g., based on the timing of the signal). Upon determining the corresponding value, the module for determining a value 1226 generates an indication of this value and outputs the indication (e.g., stores the indication in the memory 1208 or sends the indication to another component of the apparatus 1200).

The module for setting a subframe index 1228 may include circuitry and/or programming (e.g., code for setting a subframe index 1238 stored on the storage medium 1204) adapted to perform several functions relating to, for example, setting a subframe index being used by the apparatus 1200 to the value determined by the module for determining a value 1226. In some implementations, the module for setting a subframe index 1228 receives the value from the module for determining a value 1226 and rewrites a subframe index memory location with this value (e.g., in the memory 1208).

As mentioned above, programming stored by the storage medium 1204, when executed by the processing circuit 1210, causes the processing circuit 1210 to perform one or more of the various functions and/or process operations described herein. For example, the storage medium 1204 may include one or more of the code for enabling DRX 1230, the code for receiving a signal 1232, the code for identifying a condition 1234, the code for determining a value 1236, or the code for setting a subframe index 1238.

Figure 13:
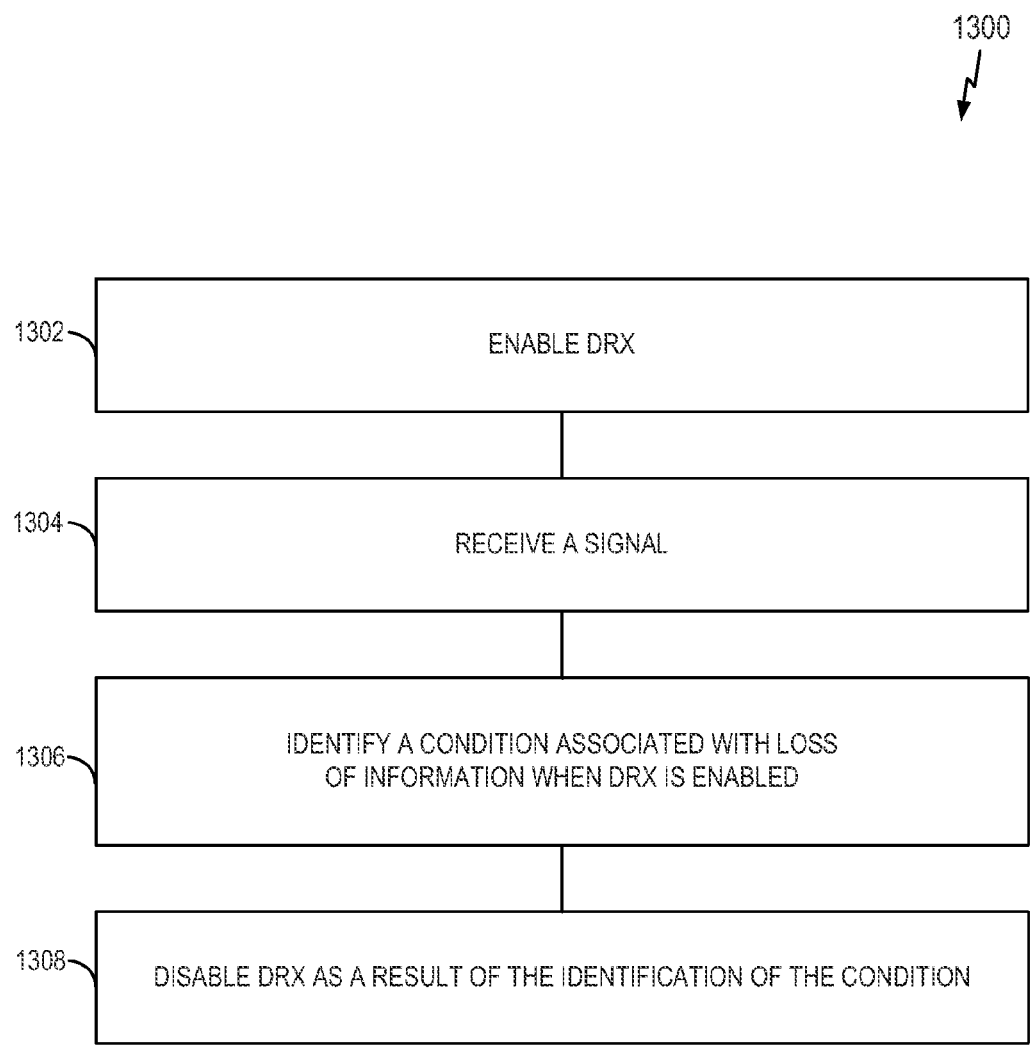
FIG. 13 is a flowchart illustrating an example of a process of conditionally disabling DRX in accordance with some aspects of the disclosure.

With the above in mind, FIG. 13 illustrates a process 1300 for controlling DRX in accordance with some aspects of the present disclosure. In some implementations, the process 1300 represents operations performed by the DRX component 724 of FIG. 7 to address Scenario 2, Scenario 3, or other scenarios. Accordingly, blocks 1302-1308 of the process 1300 may correspond to various blocks of FIGS. 8-11 as discussed below.

The process 1300 may take place within a processing circuit 1210 (FIG. 12), a processing system 1714 (FIG. 17), or some other processing entity, which may be located at an access terminal (e.g., a UE) or some other suitable apparatus. In another aspect, the process 1300 may be implemented by the UE 210 illustrated in FIG. 2. Of course, in various aspects within the scope of the present disclosure, the process 1300 may be implemented by any suitable apparatus capable of supporting DRX-related operations. For purposes of illustration, the process 1300 will be described in the context of the system 700 where the DRX component 724 of the UE 702 performs the operations of blocks 1302-1308. It should be appreciated, however, that the process 1300 could be performed by a different entity in other implementations.

In block 1302, the DRX component 724 enables DRX. For example, in some implementations, the DRX component 724 enables DRX at an access terminal upon receipt of a message from a serving base station indicating that the access terminal is to enable DRX. In some aspects, the operations of block 1302 correspond to the operations of blocks 1002-1008 of FIG. 10. In some aspects, the operations of block 1302 correspond to the operations of block 802 of FIG. 8. In some implementations, the module for enabling DRX 1220 of FIG. 12 performs the operations of block 1302. In some implementations, the code for enabling DRX 1230 of FIG. 12 is executed to perform the operations of block 1302.

In block 1304, the DRX component 724 receives a signal. For example, in some implementations, the DRX component 724 receives a signal that an access terminal received via a communication interface (e.g., that includes an RF receiver for receiving signals). As another example, in some implementations, the DRX component 724 receives a signal from another component of the access terminal. In some aspects, the received signal may be indicative of a condition associated with a loss (e.g., a potential loss) of information at the access terminal when DRX is enabled at the access terminal Examples of such a signal include, without limitation, an RLC signal, an HS-PDSCH signal, an E-DCH signal, an E-HICH signal, a signal radio bearer (SRB) signal, a signal indicative of a poor RF condition, a signal indicative of a low SIRE, or a signal indicative of low transmit power. In some aspects, the operations of block 1304 correspond to the operations of blocks 804-806 of FIG. 8. In some implementations, the module for receiving a signal 1222 of FIG. 12 performs the operations of block 1304. In some implementations, the code for receiving a signal 1232 of FIG. 12 is executed to perform the operations of block 1304.

In block 1306, the DRX component 724 identifies a condition associated with a loss (e.g., a potential loss) of information when DRX is enabled. In some aspects, the identification of the condition may involve determining that an access terminal and a serving base station are out-of-synchronization with respect to DRX. In some aspects, the condition may include an access terminal having DRX enabled while a serving base station does not have DRX enabled. In some aspects, the condition may include an access terminal using a first subframe index for DRX that is different from a second subframe index being used by a serving base station for DRX. In some aspects, the condition may include at least one of: a loss of signal radio bearer (SRB) traffic, a poor radio frequency condition, a low signal-to-interference ratio estimate, a low transmit power condition, or a drop in transmit power.

The identification of block 1306 is based, at least in part, on the signal received at block 1304. For example, in some aspects, the identification of the condition may involve determining that acknowledgements have not been received on a radio link channel; and determining that physical layer acknowledgements have been received. In some aspects, the operations of block 1306 correspond to the operations of blocks 804-806 of FIG. 8. In some implementations, the module for identifying a condition 1224 of FIG. 12 performs the operations of block 1306. In some implementations, the code for identifying a condition 1234 of FIG. 12 is executed to perform the operations of block 1306.

In block 1308, the DRX component 724 disables DRX as a result of the identification of the condition at block 1306. For example, the DRX component 724 of an access terminal may disable DRX if the DRX component 724 detects Scenario 2, Scenario 3, or some other scenario that has caused, is causing, or may cause information loss at the access terminal. In some aspects, the operations of block 1308 correspond to the operations of blocks 902-904 of FIG. 9 or block 1102 of FIG. 11. In some implementations, the module for enabling DRX 1220 of FIG. 12 performs the operations of block 1308. In some implementations, the code for enabling DRX 1230 of FIG. 12 is executed to perform the operations of block 1308.

Figure 14:
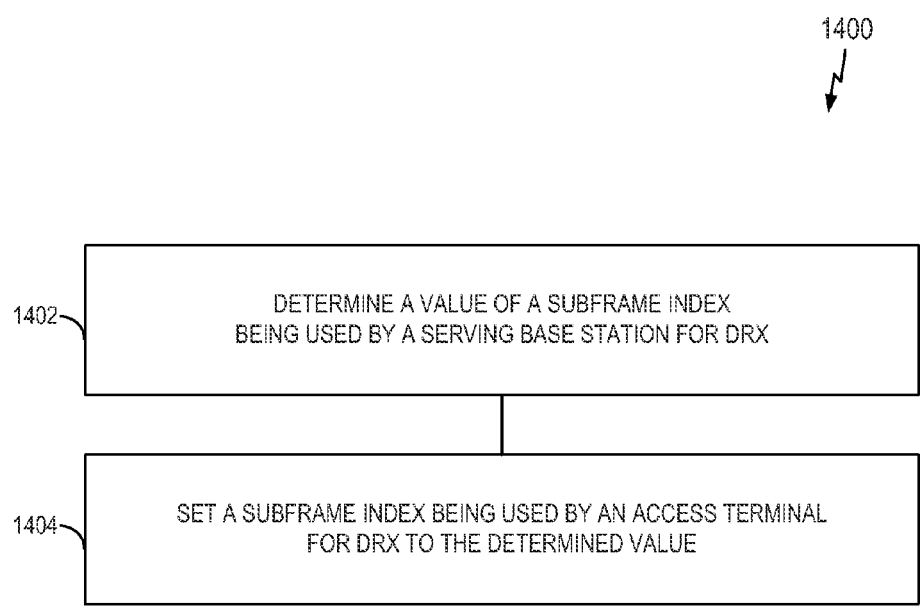
FIG. 14 is a flowchart illustrating aspects of synchronizing DRX in accordance with some aspects of the disclosure.

FIG. 14 illustrates a process 1400 for resolving a DRX out-of-synchronization condition (e.g., identified at block 1306 of FIG. 13 or block 1606 of FIG. 16) in accordance with some aspects of the present disclosure. In some implementations, the process 1400 represents operations performed by the DRX component 724 of FIG. 7 to resolve Scenario 3 or other scenarios. Accordingly, blocks 1402-1404 of the process 1400 may correspond to various blocks of FIG. 11 as discussed below.

The process 1400 may take place within a processing circuit 1210 (FIG. 12), a processing system 1714 (FIG. 17), or some other processing entity, which may be located at an access terminal (e.g., a UE) or some other suitable apparatus. In another aspect, the process 1400 may be implemented by the UE 210 illustrated in FIG. 2. Of course, in various aspects within the scope of the present disclosure, the process 1400 may be implemented by any suitable apparatus capable of supporting DRX-related operations. For purposes of illustration, the process 1400 will be described in the context of the system 700 where the DRX component 724 of the UE 702 performs the operations of blocks 1402-1404. It should be appreciated, however, that the process 1400 could be performed by a different entity in other implementations.

In block 1402, the DRX component 724 determines a value of a subframe index being used by a serving base station for DRX. In some aspects, the determination of this value may involve: starting an inactivity counter while DRX is disabled; keeping DRX disabled upon expiration of the inactivity counter until a control signal is received; and identifying a subframe in which the control signal is received. In some aspects, the operations of block 1402 correspond to the operations of blocks 1102-1112 of FIG. 11. In some implementations, the module for determining a value 1226 of FIG. 12 performs the operations of block 1402. In some implementations, the code for determining a value 1236 of FIG. 12 is executed to perform the operations of block 1402.

In block 1404, the DRX component 724 sets the subframe index being used by an access terminal for DRX to the value determined at block 1402. In some aspects, the operations of block 1404 correspond to the operations of block 1112 of FIG. 11. In some implementations, the module for setting a subframe index 1228 of FIG. 12 performs the operations of block 1404. In some implementations, the code for setting a subframe index 1238 of FIG. 12 is executed to perform the operations of block 1404.

Figure 15:
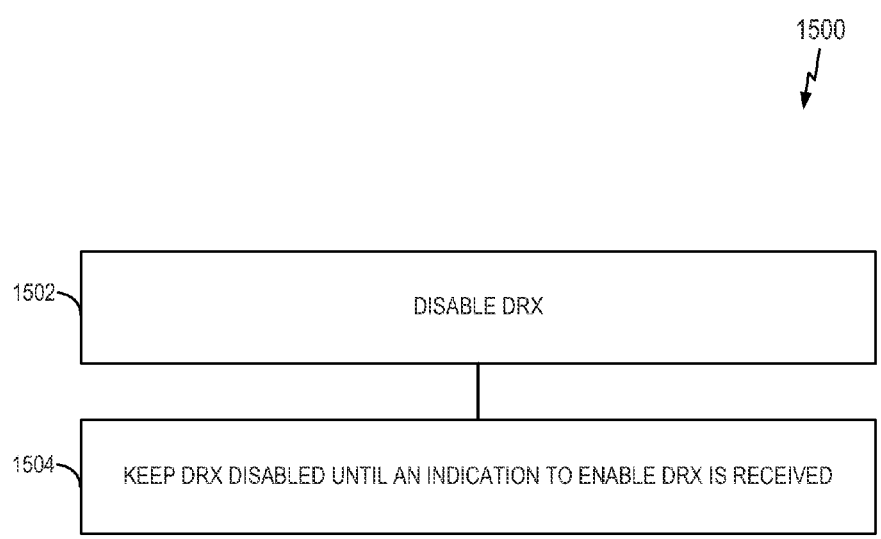
FIG. 15 is a flowchart illustrating additional aspects of disabling DRX in accordance with some aspects of the disclosure.

FIG. 15 illustrates a process 1500 involving additional aspects for controlling DRX in accordance with some aspects of the present disclosure (e.g., operations performed by the DRX component 724 of FIG. 7 to resolve Scenario 3 or other scenarios). For example, in some implementations, the process 1500 corresponds to the operations of block 1308 of FIG. 13.

The process 1500 may take place within a processing circuit 1210 (FIG. 12), a processing system 1714 (FIG. 17), or some other processing entity, which may be located at an access terminal (e.g., a UE) or some other suitable apparatus. In another aspect, the process 1500 may be implemented by the UE 210 illustrated in FIG. 2. Of course, in various aspects within the scope of the present disclosure, the process 1500 may be implemented by any suitable apparatus capable of supporting DRX-related operations. For purposes of illustration, the process 1500 will be described in the context of the system 700 where the DRX component 724 of the UE 702 performs the operations of blocks 1502-1504. It should be appreciated, however, that the process 1500 could be performed by a different entity in other implementations.

In block 1502, the DRX component 724 disables DRX. For example, DRX may be disabled as a result of the identification of the condition at block 1306 of FIG. 13 or block 1606 of FIG. 16. In some aspects, the operations of block 1502 correspond to the operations of block 902 of FIG. 9. In some implementations, the module for enabling DRX 1220 of FIG. 12 performs the operations of block 1502. In some implementations, the code for enabling DRX 1230 of FIG. 12 is executed to perform the operations of block 1502.

In block 1504, the DRX component 724 keeps DRX disabled until an indication to enable DRX is received. For example, DRX may remain disabled at an access terminal until the access terminal receives, from a serving base station, an SCCH Order or an RBR message instructing the access terminal to enable DRX. In some aspects, the operations of block 1504 correspond to the operations of block 904 of FIG. 9. In some implementations, the module for enabling DRX 1220 of FIG. 12 performs the operations of block 1504. In some implementations, the code for enabling DRX 1230 of FIG. 12 is executed to perform the operations of block 1504.

Figure 16:
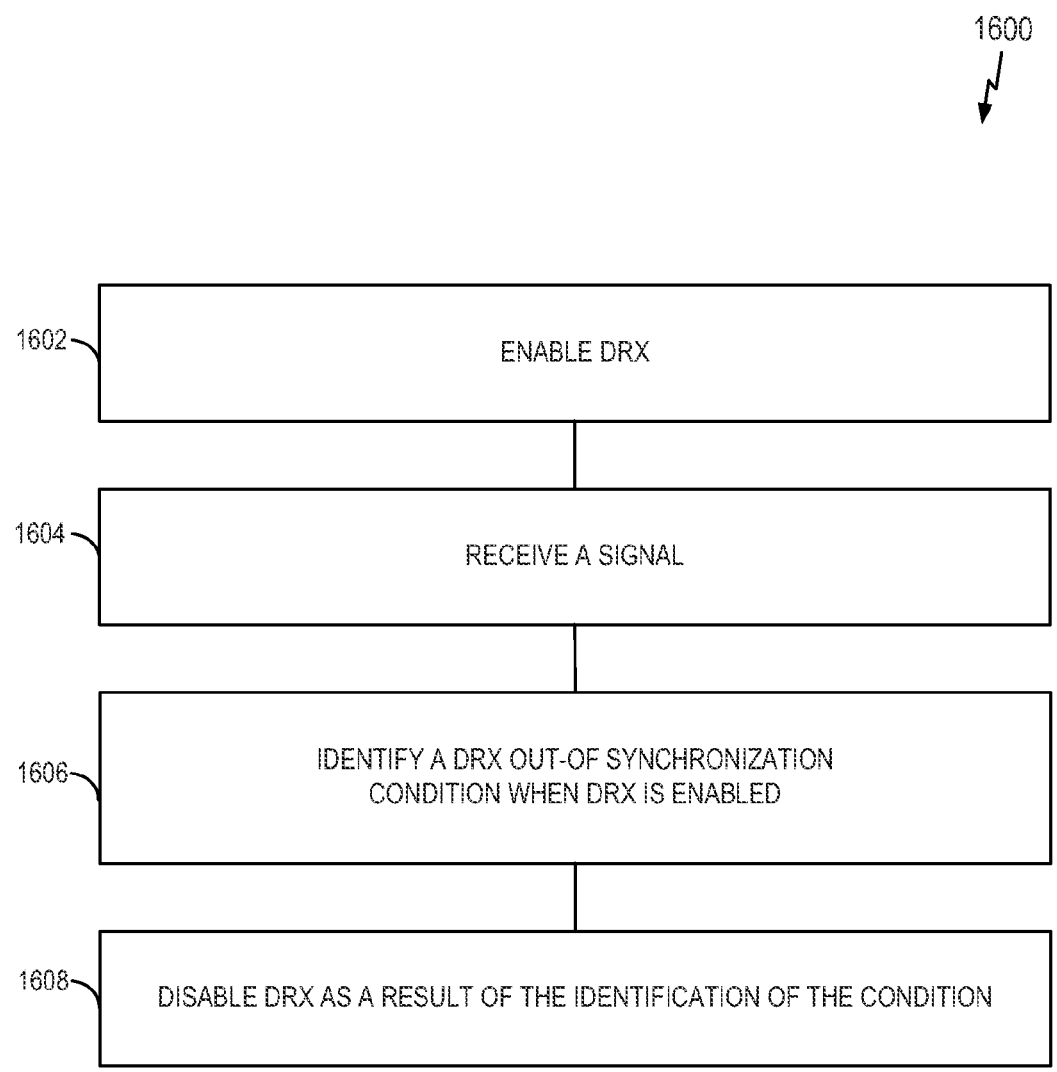
FIG. 16 is a flowchart illustrating another example of a process of conditionally disabling DRX in accordance with some aspects of the disclosure.

FIG. 16 illustrates a process 1600 for controlling DRX in accordance with some aspects of the present disclosure. In some implementations, the process 1600 represents operations performed by the DRX component 724 of FIG. 7 to address Scenario 2 or Scenario 3. Accordingly, blocks 1602-1608 of the process 1600 may correspond to various blocks of FIGS. 8-11 as discussed below.

The process 1600 may take place within a processing circuit 1210 (FIG. 12), a processing system 1714 (FIG. 17), or some other processing entity, which may be located at an access terminal (e.g., a UE) or some other suitable apparatus. In another aspect, the process 1600 may be implemented by the UE 210 illustrated in FIG. 2. Of course, in various aspects within the scope of the present disclosure, the process 1600 may be implemented by any suitable apparatus capable of supporting DRX-related operations. For purposes of illustration, the process 1600 will be described in the context of the system 700 where the DRX component 724 of the UE 702 performs the operations of blocks 1602-1608. It should be appreciated, however, that the process 1600 could be performed by a different entity in other implementations.

In block 1602, the DRX component 724 enables DRX. For example, in some implementations, the DRX component 724 enables DRX at an access terminal upon receipt of a message from a serving base station indicating that the access terminal is to enable DRX. In some aspects, the operations of block 1602 correspond to the operations of blocks 1002-1008 of FIG. 10. In some aspects, the operations of block 1602 correspond to the operations of block 802 of FIG. 8. In some implementations, the module for enabling DRX 1220 of FIG. 12 performs the operations of block 1602. In some implementations, the code for enabling DRX 1230 of FIG. 12 is executed to perform the operations of block 1602.

In block 1604, the DRX component 724 receives a signal. For example, in some implementations, the DRX component 724 receives a signal that an access terminal received via a communication interface (e.g., that includes an RF receiver for receiving signals). As another example, in some implementations, the DRX component 724 receives a signal from another component of the access terminal. In some aspects, the received signal may be indicative of a DRX out-of-synchronization condition when DRX is enabled at the access terminal Examples of such a signal include, without limitation, an RLC signal, an HS-PDSCH signal, an E-DCH signal, an E-HICH signal, a signal radio bearer (SRB) signal, a signal indicative of a poor RF condition, a signal indicative of a low SIRE, or a signal indicative of low transmit power. In some aspects, the operations of block 1604 correspond to the operations of blocks 804-806 of FIG. 8. In some implementations, the module for receiving a signal 1222 of FIG. 12 performs the operations of block 1604. In some implementations, the code for receiving a signal 1232 of FIG. 12 is executed to perform the operations of block 1604.

In block 1606, the DRX component 724 identifies a DRX out-of-synchronization condition when DRX is enabled. In some aspects, the identification of the condition may involve determining that an access terminal and a serving base station are out-of-synchronization with respect to DRX. In some aspects (e.g., Scenario 2), the condition may include an access terminal having DRX enabled while a serving base station does not have DRX enabled. In some aspects (e.g., Scenario 3), the condition may include an access terminal using a first subframe index for DRX that is different from a second subframe index being used by a serving base station for DRX. In some aspects, the condition may be identified based on at least one of: a loss of signal radio bearer (SRB) traffic, a poor radio frequency condition, a low signal-to-interference ratio estimate, a low transmit power condition, or a drop in transmit power.

The identification of block 1606 is based, at least in part, on the signal received at block 1604. For example, in some aspects, the identification of the condition may involve determining that acknowledgements have not been received on a radio link channel; and determining that physical layer acknowledgements have been received. In some aspects, the operations of block 1606 correspond to the operations of blocks 804-806 of FIG. 8. In some implementations, the module for identifying a condition 1224 of FIG. 12 performs the operations of block 1606. In some implementations, the code for identifying a condition 1234 of FIG. 12 is executed to perform the operations of block 1606.

In block 1608, the DRX component 724 disables DRX as a result of the identification of the condition at block 1606. For example, the DRX component 724 of an access terminal may disable DRX if the DRX component 724 detects Scenario 2, Scenario 3, or some other scenario that has caused, is causing, or may cause a loss of DRX synchronization at the access terminal. In some aspects, the operations of block 1608 correspond to the operations of blocks 902-904 of FIG. 9 or block 1102 of FIG. 11. In some implementations, the module for enabling DRX 1220 of FIG. 12 performs the operations of block 1608. In some implementations, the code for enabling DRX 1230 of FIG. 12 is executed to perform the operations of block 1608.

Additional Aspects

Figure 17:
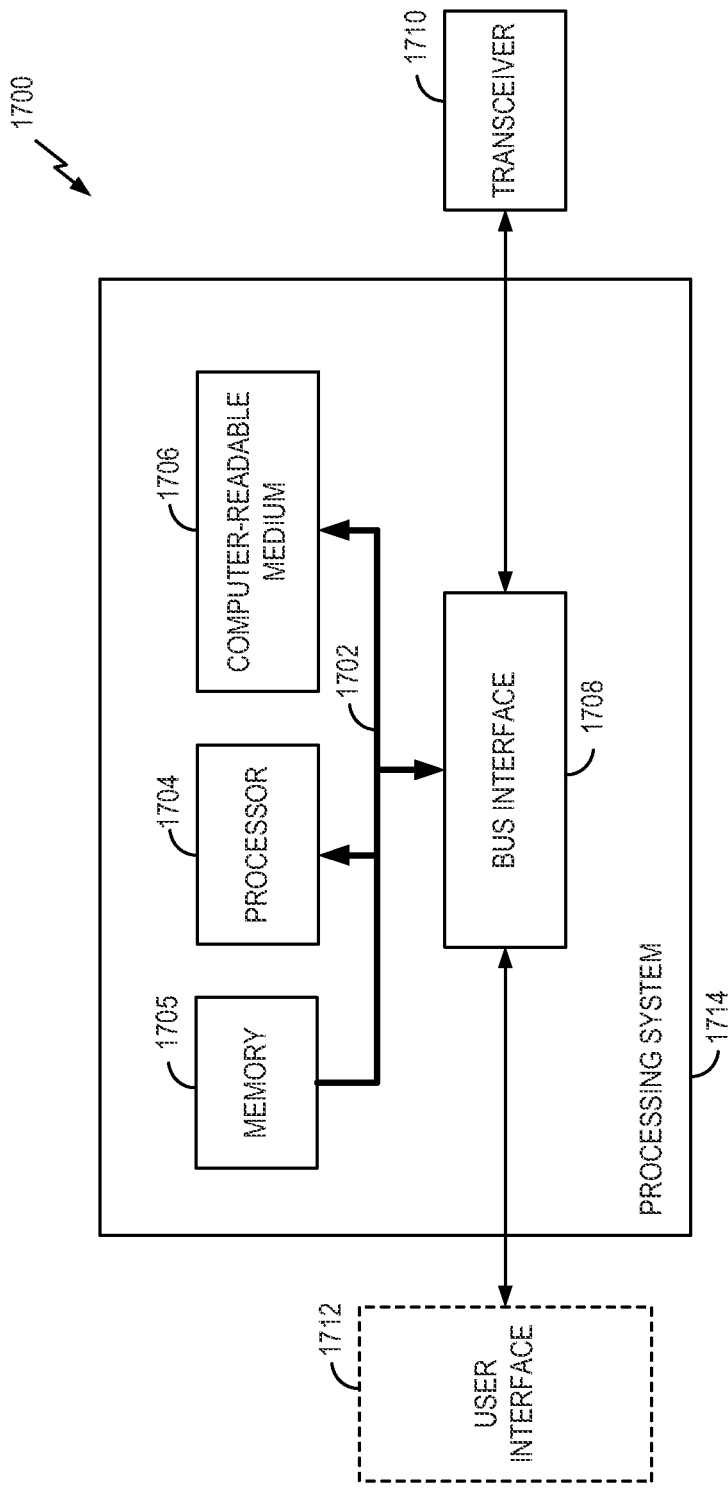
FIG. 17 is a block diagram illustrating a hardware implementation for an apparatus employing a processing system in accordance with some aspects of the disclosure.

FIG. 17 is a block diagram illustrating an example of a hardware implementation for an apparatus 1700 employing a processing system 1714 that can implement one or more aspects of the disclosure. For example, in some implementations, the apparatus 1700 is (or is incorporated into) the UE 702 of FIG. 7, whereby the transmitter 706 and the receiver 710 of FIG. 7 are implemented in the transceiver 1710 of FIG. 17 and the DRX component 724 of FIG. 7 is implemented in the processing system 1714 of FIG. 17. As another example, in some implementations, the processing circuit 1210, the memory 1208, and the storage medium 1204 of FIG. 12 are implemented as the processing system 1714 of FIG. 17.

In this example, the processing system 1714 may be implemented with a bus architecture, represented generally by the bus 1702. The bus 1702 may include any number of interconnecting buses and bridges depending on the specific application of the processing system 1714 and the overall design constraints. The bus 1702 links together various circuits including one or more processors, represented generally by the processor 1704, a memory 1705, and computer-readable media, represented generally by the computer-readable medium 1706. The bus 1702 may also link various other circuits such as timing sources, peripherals, voltage regulators, and power management circuits, which are well known in the art, and therefore, will not be described any further. A bus interface 1708 provides an interface between the bus 1702 and a transceiver 1710. The transceiver 1710 provides a means for communicating with various other apparatus over a transmission medium. Depending upon the nature of the apparatus, a user interface 1712 (e.g., keypad, display, speaker, microphone, joystick) may also be provided.

The processor 1704 is responsible for managing the bus 1702 and general processing, including the execution of software stored on the computer-readable medium 1706. The software, when executed by the processor 1704, causes the processing system 1714 to perform the various functions described infra for any particular apparatus. The computer-readable medium 1706 may also be used for storing data that is manipulated by the processor 1704 when executing software.

Figure 18:
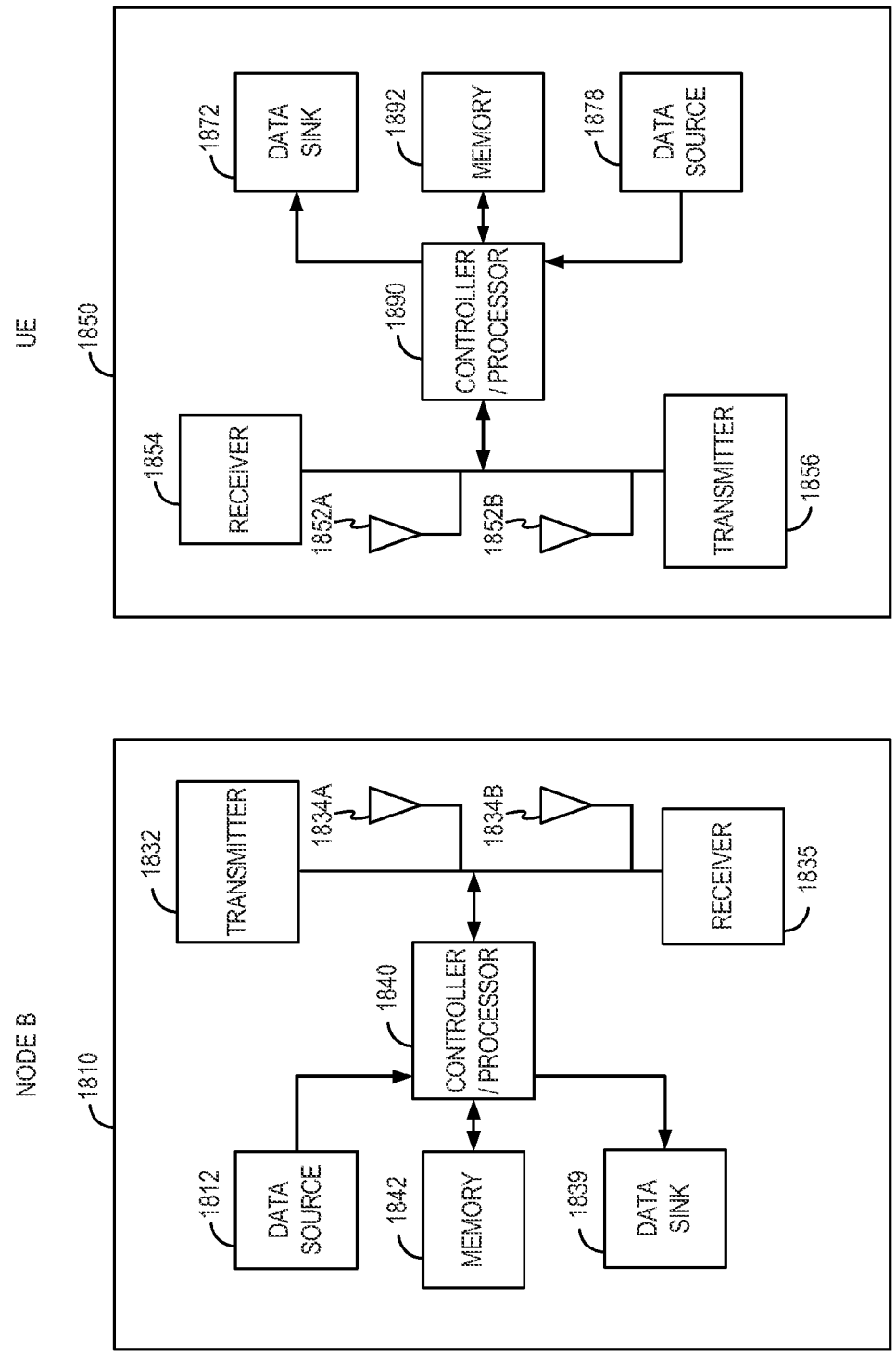
FIG. 18 is a block diagram illustrating an example of a base station in communication with an access terminal in a communication network.

FIG. 18 is a block diagram of an exemplary Node B 1810 in communication with an exemplary UE 1850, where the Node B 1810 may be the Node B 188 in FIG. 2, and the UE 1850 may be the UE 210 in FIG. 2. In the downlink communication, a controller or processor 1840 may receive data from a data source 1812. Channel estimates may be used by a controller/processor 1840 to determine the coding, modulation, spreading, and/or scrambling schemes for the transmit processor 1820. These channel estimates may be derived from a reference signal transmitted by the UE 1850 or from feedback from the UE 1850. A transmitter 1832 may provide various signal conditioning functions including amplifying, filtering, and modulating frames onto a carrier for downlink transmission over a wireless medium through one or more antennas 1834. The antennas 1834 may include one or more antennas, for example, including beam steering bidirectional adaptive antenna arrays, MIMO arrays, or any other suitable transmission/reception technologies.

At the UE 1850, a receiver 1854 receives the downlink transmission through one or more antennas 1852 and processes the transmission to recover the information modulated onto the carrier. The information recovered by the receiver 1854 is provided to a controller/processor 1890. The processor 1890 descrambles and despreads the symbols, and determines the most likely signal constellation points transmitted by the Node B 1810 based on the modulation scheme. These soft decisions may be based on channel estimates computed by the processor 1890. The soft decisions are then decoded and deinterleaved to recover the data, control, and reference signals. The CRC codes are then checked to determine whether the frames were successfully decoded. The data carried by the successfully decoded frames will then be provided to a data sink 1872, which represents applications running in the UE 1850 and/or various user interfaces (e.g., display). Control signals carried by successfully decoded frames will be provided to a controller/processor 1890. When frames are unsuccessfully decoded, the controller/processor 1890 may also use an acknowledgement (ACK) and/or negative acknowledgement (NACK) protocol to support retransmission requests for those frames.

In the uplink, data from a data source 1878 and control signals from the controller/processor 1890 are provided. The data source 1878 may represent applications running in the UE 1850 and various user interfaces (e.g., keyboard). Similar to the functionality described in connection with the downlink transmission by the Node B 1810, the processor 1890 provides various signal processing functions including CRC codes, coding and interleaving to facilitate FEC, mapping to signal constellations, spreading with OVSFs, and scrambling to produce a series of symbols. Channel estimates, derived by the processor 1890 from a reference signal transmitted by the Node B 1810 or from feedback contained in a midamble transmitted by the Node B 1810, may be used to select the appropriate coding, modulation, spreading, and/or scrambling schemes. The symbols produced by the processor 1890 will be utilized to create a frame structure. The processor 1890 creates this frame structure by multiplexing the symbols with additional information, resulting in a series of frames. The frames are then provided to a transmitter 1856, which provides various signal conditioning functions including amplification, filtering, and modulating the frames onto a carrier for uplink transmission over the wireless medium through the one or more antennas 1852.

The uplink transmission is processed at the Node B 1810 in a manner similar to that described in connection with the receiver function at the UE 1850. A receiver 1835 receives the uplink transmission through the one or more antennas 1834 and processes the transmission to recover the information modulated onto the carrier. The information recovered by the receiver 1835 is provided to the processor 1840, which parses each frame. The processor 1840 performs the inverse of the processing performed by the processor 1890 in the UE 1850. The data and control signals carried by the successfully decoded frames may then be provided to a data sink 1839. If some of the frames were unsuccessfully decoded by the receive processor, the controller/processor 1840 may also use an acknowledgement (ACK) and/or negative acknowledgement (NACK) protocol to support retransmission requests for those frames.

The controller/processors 1840 and 1890 may be used to direct the operation at the Node B 1810 and the UE 1850, respectively. For example, the controller/processors 1840 and 1890 may provide various functions including timing, peripheral interfaces, voltage regulation, power management, and other control functions. The computer readable media of memories 1842 and 1892 may store data and software for the Node B 1810 and the UE 1850, respectively.

CONCLUSION

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, the disclosed aspects can be implemented according to various network technologies including, without limitation, fifth generation (5G) mobile phone technology, fourth generation (4G) mobile phone technology, third generation (3G) mobile phone technology, and other network architectures. Various aspects may be extended to UMTS systems such as TD-SCDMA and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

While the above discussed aspects, arrangements, and implementations are discussed with specific details and particularity, one or more of the components, operations, features and/or functions illustrated in one or more of FIGS. 1-18 may be rearranged and/or combined into a single component, operation, feature or function or embodied in several components, operations, or functions. Additional elements, components, operations, and/or functions may also be added or not utilized without departing from the teachings herein. The apparatus, devices and/or components illustrated in one or more of FIG. 1, 2, 7, 12, 17, or 18 may be configured to perform or employ one or more of the methods, features, parameters, or operations described in one or more of FIGS. 3-6, 8-11, or 13-16. The novel algorithms described herein may also be efficiently implemented in software and/or embedded in hardware.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function. The various methods described herein may be partially or fully implemented by programming (e.g., instructions and/or data) that may be stored in a machine-readable, computer-readable, and/or processor-readable storage medium, and executed by one or more processors, machines and/or devices.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

Those of skill in the art would further appreciate that the various illustrative logical blocks, modules, circuits, and algorithm operations described in connection with the aspects disclosed herein may be implemented as hardware, software, firmware, middleware, microcode, or any combination thereof. To clearly illustrate this interchangeability, various illustrative components, blocks, modules, circuits, and operations have been described above generally in terms of their functionality. Whether such functionality is implemented as hardware or software depends upon the particular application and design constraints imposed on the overall system.

The teachings herein may be incorporated into (e.g., implemented within or performed by) a variety of apparatuses. In some aspects, a wireless apparatus implemented in accordance with the teachings herein may be an access point or an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations, an access terminal may be a cellular telephone, a cordless telephone, a session initiation protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music device, a video device, or a satellite radio), a global positioning system device, a camera, a wearable computing device (e.g., a smartwatch, a health or fitness tracker, etc.), an appliance, a sensor, a vending machine, or any other suitable device that is configured to communicate via a wireless medium.

An access point may comprise, be implemented as, or known as a NodeB, an eNodeB, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or some other similar terminology.

In some aspects, an apparatus (e.g., an access point) may be an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

Also, it should be appreciated that a wireless apparatus may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

In some aspects, an apparatus or any component of an apparatus may be configured to (or operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation.

The term "coupled" is used herein to refer to the direct or indirect coupling between two objects. For example, if object A physically touches object B, and object B touches object C, then objects A and C may still be considered coupled to one another—even if they do not directly physically touch each other. For instance, a first die may be coupled to a second die in a package even though the first die is never directly physically in contact with the second die.

The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; a, b and c; 2a, 2b; and so on.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may include one or more elements.

The various features associated with the examples described herein and shown in the accompanying drawings can be implemented in different examples and implementations without departing from the scope of the present disclosure. Therefore, although certain specific constructions and arrangements have been described and shown in the accompanying drawings, such aspects are merely illustrative and not restrictive of the scope of the disclosure, since various other additions and modifications to, and deletions from, the described aspects will be apparent to one of ordinary skill in the art. Based on the teachings herein, one skilled in the art should appreciate that an aspect disclosed herein may be implemented independently of any other aspects and that two or more of these aspects may be combined in various ways.

Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference and are intended to be encompassed by the claims.

The above description is provided to enable any person skilled in the art to practice the various aspects described herein. Nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A method for wireless communication, comprising:
    enabling discontinuous reception (DRX) at an access terminal;
    receiving a physical layer acknowledgement from a serving base station when DRX is enabled at the access terminal;
    identifying a DRX out-of-synchronization condition between the access terminal and the serving base station when DRX is enabled at the access terminal; and
    disabling DRX as a result of the identification of the condition,
    wherein the condition comprises the access terminal using a first subframe index for receiving a transmission from the serving base station during DRX that is different from a second subframe index being used by the serving base station for sending the transmission to the access terminal during DRX, the method further comprising:
        determining a value of the second subframe index being used by the serving base station for sending the transmission to the access terminal during DRX, and
        setting the first subframe index being used by the access terminal for receiving the transmission from the serving base station during DRX to the determined value.

2. The method of claim 1, wherein:
    the physical layer acknowledgement acknowledges reception of an uplink transmission from the access terminal; and
    the identification of the condition comprises determining that the physical layer acknowledgement is received without receiving a radio link channel (RLC) layer acknowledgement when DRX is enabled at the access terminal.

3. The method of claim 1, wherein the determination of the value comprises:
    starting an inactivity counter while DRX is disabled;
    keeping DRX disabled upon expiration of the inactivity counter until a control signal is received; and
    identifying a subframe in which the control signal is received.

4. The method of claim 1, wherein the condition comprises the access terminal having DRX enabled while the serving base station does not have DRX enabled, the method further comprising:
    keeping DRX disabled until an indication to enable DRX is received.

5. An apparatus for wireless communication, comprising:
    a processing circuit; and
    a communication interface coupled to the processing circuit and configured to receive a physical layer acknowledgement from a serving base station when discontinuous reception (DRX) is enabled at an access terminal,
    wherein the processing circuit is configured to:
        enable DRX at the access terminal;
        identify a DRX out-of-synchronization condition between the access terminal and the serving base station when DRX is enabled at the access terminal; and
        disable DRX as a result of the identification of the condition,
    wherein the condition comprises the access terminal using a first subframe index for receiving a transmission from the serving base station during DRX that is different from a second subframe index being used by the serving base station for sending the transmission to the access terminal during DRX, the processing circuit further configured to:
        determine a value of the second subframe index being used by the serving base station for sending the transmission to the access terminal during DRX, and
        set the first subframe index being used by the access terminal for receiving the transmission from the serving base station during DRX to the determined value.

6. The apparatus of claim 5, wherein:
    the physical layer acknowledgement acknowledges reception of an uplink transmission from the access terminal; and
    the identification of the condition comprises determining that the physical layer acknowledgement is received without receiving a radio link channel (RLC) layer acknowledgement when DRX is enabled at the access terminal.

7. The apparatus of claim 5, wherein the determination of the value comprises:
    starting an inactivity counter while DRX is disabled;
    keeping DRX disabled upon expiration of the inactivity counter until a control signal is received; and
    identifying a subframe in which the control signal is received.

8. The apparatus of claim 5, wherein:
    the condition comprises the access terminal having DRX enabled while the serving base station does not have DRX enabled; and
    the processing circuit is further configured to keep DRX disabled until an indication to enable DRX is received.

9. An apparatus for wireless communication, comprising:
    means for enabling discontinuous reception (DRX) at an access terminal;
    means for receiving a physical layer acknowledgement from a serving base station when DRX is enabled at the access terminal; and means for identifying a DRX out-of-synchronization condition between the access terminal and the serving base station when DRX is enabled at the access terminal,
wherein the means for enabling DRX is configured to disable DRX as a result of the identification of the condition,
wherein the condition comprises the access terminal using a first subframe index for receiving a transmission from the serving base station during DRX that is different from a second subframe index being used by the serving base station for sending the transmission to the access terminal during DRX, the apparatus further comprising:
means for determining a value of the second subframe index being used by the serving base station for sending the transmission to the access terminal during DRX, and
means for setting the first subframe index being used by the access terminal for receiving the transmission from the serving base station during DRX to the determined value.

10. The apparatus of claim 9, wherein:
the physical layer acknowledgement acknowledges reception of an uplink transmission from the access terminal; and
the identification of the condition comprises determining that the physical layer acknowledgement is received without receiving a radio link channel (RLC) layer acknowledgement when DRX is enabled at the access terminal.

11. The apparatus of claim 9, wherein the determination of the value comprises:
starting an inactivity counter while DRX is disabled;
keeping DRX disabled upon expiration of the inactivity counter until a control signal is received; and
identifying a subframe in which the control signal is received.

12. The apparatus of claim 9, wherein:
the condition comprises the access terminal having DRX enabled while the serving base station does not have DRX enabled; and
the means for enabling DRX is configured to keep DRX disabled until an indication to enable DRX is received.

13. A non-transitory computer readable medium storing computer executable code, including code to:
enable discontinuous reception (DRX) at an access terminal;
receive a physical layer acknowledgement from a serving base station when DRX is enabled at the access terminal;
identify a DRX out-of-synchronization condition between the access terminal and the serving base station when DRX is enabled at the access terminal; and
disable DRX as a result of the identification of the condition,
wherein the condition comprises the access terminal using a first subframe index for receiving a transmission from the serving base station during DRX that is different from a second subframe index being used by the serving base station for sending the transmission to the access terminal during DRX, the computer-readable medium further comprising instructions for causing the computer to:
determine a value of the second subframe index being used by the serving base station for sending the transmission to the access terminal during DRX, and
set the first subframe index being used by the access terminal for receiving the transmission from the serving base station during DRX to the determined value.

14. The computer-readable medium of claim 13, wherein the physical layer acknowledgement acknowledges reception of an uplink transmission from the access terminal; and
the identification of the condition comprises determining that the physical layer acknowledgement is received without receiving a radio link channel (RLC) layer acknowledgement when DRX is enabled at the access terminal.

15. The computer-readable medium of claim 13, wherein the determination of the value comprises:
starting an inactivity counter while DRX is disabled;
keeping DRX disabled upon expiration of the inactivity counter until a control signal is received; and
identifying a subframe in which the control signal is received.

16. The computer-readable medium of claim 13, wherein:
the condition comprises the access terminal having DRX enabled while the serving base station does not have DRX enabled; and
the computer-readable medium further comprises instructions for causing the computer to keep DRX disabled until an indication to enable DRX is received.

* * * * *